United States Patent Office 3,213,078
Patented Oct. 19, 1965

3,213,078
PYRIMIDINE DYESTUFFS
Jakob Benz, Oberwil, Basel-Land, Hans Ischer, Basel, Karl Kaegi, Riehen, and Hans Siegrist and Hanspeter Uehlinger, Basel, Switzerland, assignors to Sandoz Ltd. (also known as Sandoz A.G.), Basel, Switzerland, a Swiss firm
No Drawing. Filed Feb. 1, 1963, Ser. No. 255,677
Claims priority, application Switzerland, Apr. 29, 1959, 72,678/59
16 Claims. (Cl. 260—146)

The present application is a continuation-in-part of our application Ser. No. 25,239; filed on April 25, 1960 (abandoned since the filing of the present application).

The invention relates to water-soluble organic dyestuffs which contain at least one reactive group of the formula

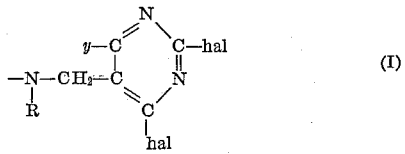

wherein:

hal represents a halogen atom with an atomic number from 17 to 35 inclusive, i.e. chlorine or bromine,
R represents hydrogen or optionally substituted alkyl, and
y represents hydrogen or lower alkyl.

The process of production of these new dyestuffs consists in condensing organic dyestuffs which contain at least one, but preferably more than one, water-solubilizing group and at least one optionally monosubstituted amino group or organic compounds which contain at least one optionally monosubstituted amino group and at least one substituent capable of dyestuff formation, with a 2,4-dihalo-5-halomethyl-pyrimidine of the formula

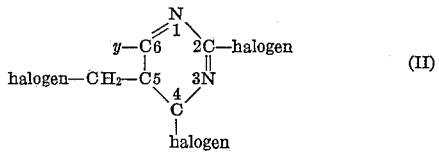

wherein:

halogen represents chlorine or bromine, and
y represents hydrogen or lower alkyl, e.g. methyl, upon which the reaction products, when they contain radicals of organic compounds with substituents capable of dyestuff formation, are converted into water-soluble dyestuffs by a suitable reaction, e.g. azo coupling or condensation.

The new process is applicable with all classes of water-soluble dyestuffs. The amino group may be monosubstituted by alkyl, hydroxylalkyl, alkoxyalkyl or halogenoalkyl radicals. Thus, noteworthy examples of water-soluble organic dyestuffs which contain at least one optionally monosubstituted amino group are aminomonoazo and aminopolyazo dyestuffs, aminoanthraquinone dyestuffs and aminophthalocyanine dyestuffs. The aminomonoazo and aminopolyazo dyestuffs may contain metal atoms bound by co-ordination links, e.g. chromium, cobalt, nickel or copper atoms. Alternatively, suitable aminoazo dyestuffs which contain metallizable groupings can be reacted with 2,4-dihalo-5-halomethylpyrimidine of the Formula II. The dyestuffs so formed can be metallized in substance after condensation or they can be applied to the fiber in the metal-free form and the dyeings aftertreated with metal-yielding agents.

The optionally monosubstituted amino group can be attached directly to aromatic nuclei of the dyestuff molecule or indirectly through an aliphatic chain and, depending on circumstances, a bridge member. The following are examples of aliphatic chains:

$$-CH_2-, -CH_2-CH_2-, -CH_2-CH_2-CH_2-, -CH_2-CH-,$$
$$\phantom{-CH_2-, -CH_2-CH_2-, -CH_2-CH_2-CH_2-, -CH_2-}CH_3$$
$$-CH-CH_2-, -CH_2-CH_2-CH_2-CH_2-$$
$$CH_3$$

Examples of suitable bridge members are:

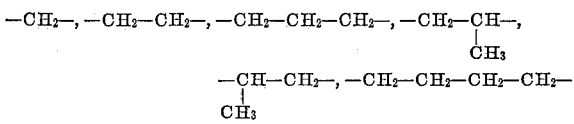

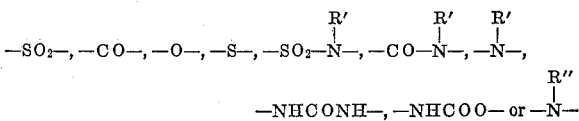

wherein:

R' represents hydrogen, low molecular alkyl or hydroxyalkyl, cycloalkyl, aryl or aralkyl, and
R" stands for an acyl radical.

In accordance with the definition it is possible to arrive at water-soluble dyestuffs containing at least one group of the formula I by another route starting from organic compounds which possess at least one optionally monosubstitued amino group and at least one substituent capable of dyestuff formation. The azo coupling has a significant bearing on the reaction giving the final dyestuffs. It can be effected by reacting a compound containing at least one optionally monosubstituted amino group and one diazotizable amino group with a 2,4-dihalo-5-halomethylpyrimidine of the Formula II, and then diazotizing the intermediate product and coupling the diazo compound with a coupling component to give a water-soluble dyestuff, or by reacting a compound containing at least one optionally monosubstituted amino group and a substituent convertible into a diazotizable amino group with a 2,4-dihalo-5-halomethylpyrimidine of the Formula II, and converting the said substituent in the intermediate product into the amino group, diazotizing the amino compound, and coupling the diazo compound with a coupling component to arrive at a water-soluble dyestuff.

Further, it is possible to condense compounds having at least one optionally monosubstituted amino group and at least one carbon atom capable of coupling, e.g. aminohydroxy compounds, with a 2,4-dihalo-5-halomethylpyrimidine of the Formula II to obtain an intermediate product which is used as coupling component. Naturally, the diazo compound of a diazo component containing a group of the Formula I can also be coupled with a coupling component which likewise contains a group of the Formula I.

Examples of organic compounds which can be used for producing the pyrimidine dyestuffs are: 1,3- and 1,4-diaminobenzenesulfonic acids and -carboxylic acids, 4,4'-diamino-1,1'-diphenyl-3-sulfonic acid, 1-(3'- or 4'-amino)-phenyl-3-methyl-5 pyrazolones, aminohydroxynaphthalenes or, for preference, their sulfonic acids, e.g. 2-amino-5-hydroxynaphthalene-7-sulfonic acid, 2-amino-8-hydroxynaphthalene-6-sulfonic acid, 1-amino-8-hydroxynaphthalene-4,6-disulfonic acid, 1-amino-8-hydroxynaphthalene-3,6-disulfonic acid.

In the following a number of different dyestuff schemes are described in order to characterize the invention without, however, limiting it to these schemes.

I. AZO DYESTUFFS (1) Dyestuffs of the general formula

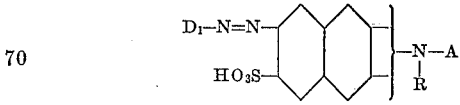

wherein:

A stands for a group of the Formula I,
R for hydrogen or an optionally substituted lower alkyl radical, and
$D_1$ for the radical of a diazo component which contains at least one acid water-solubilizing group and may contain azo groups.

Particularly valuable are diazo components in which the radical $D_1$ has the formula

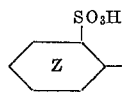

and in which the benzene nucleus Z may carry further substituents, e.g.

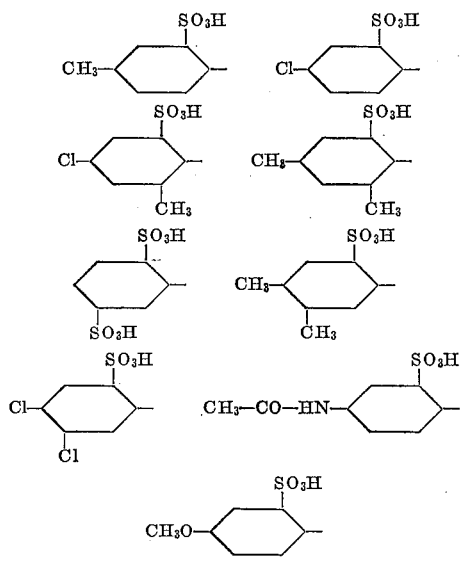

There are other radicals of diazo components which are equally well suited, among them the following:

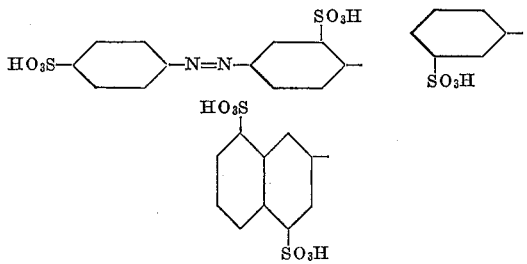

(2) Dyestuffs of the general formula

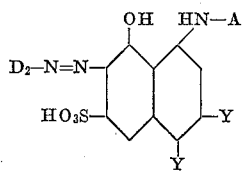

wherein:
A has the aforecited meaning,
One Y stands for hydrogen and the other for a sulfonic acid group, and
$D_2$ stands for the radical of a diazo component which may contain azo groups and water-solubilizing groups, e.g.

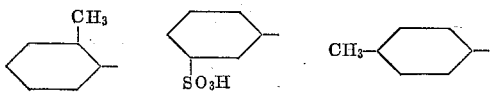

Of especial value are diazo components whose radicals correspond to the formula

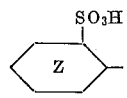

and in which the benzene nucleus Z may contain further substituents, e.g.

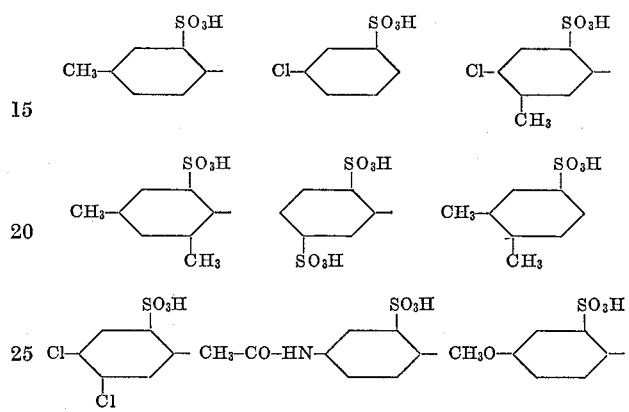

(3) Dyestuffs of the general formula

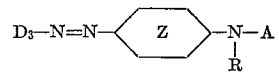

wherein:
A and R possess the aforecited meanings,
$D_3$ stands for the radical of a diazo component which contains at least two acid water-solubilizing groups and may contain further substituents such as azo groups, especially the radicals

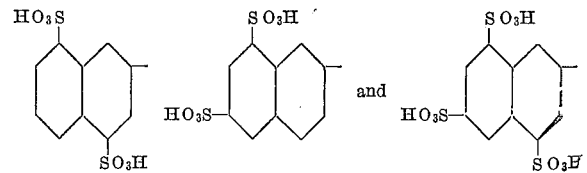

and wherein the benzene nucleus Z may contain further substituents, e.g.

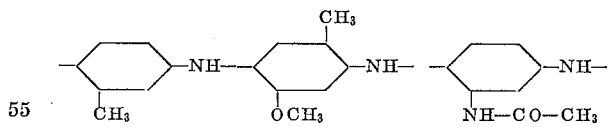

(4) Monoazo dyestuffs with at least two acid water solubilizing groups of general formula

wherein:
A and R possess the aforecited meanings,
$D_4$ stands for the radical of a diazo component, e.g.

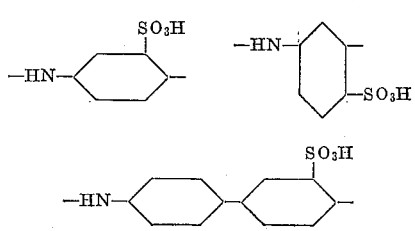

and $K_1$ for the radical of a hydroxynaphthalenesulfonic acid which may be further substituted, e.g.

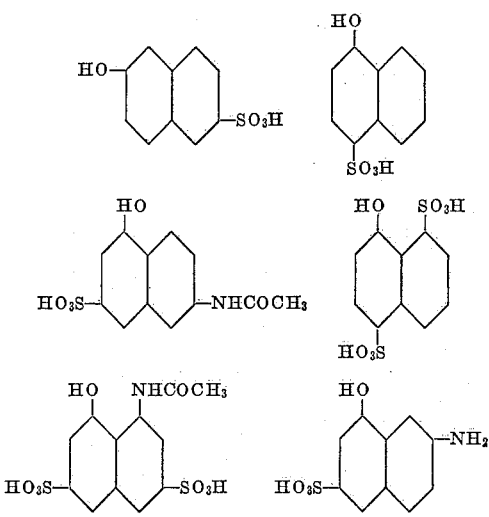

or a ketomethylene compound, e.g.

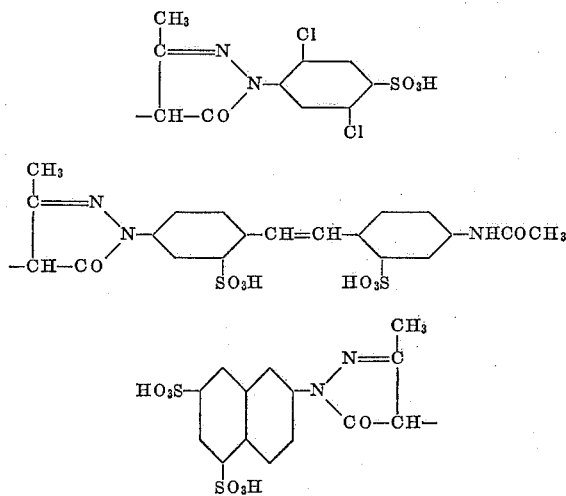

(5) Dyestuffs of general formula

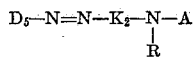

wherein: A and R possess the aforecited meanings,
$D_5$ stands for the radical of a diazo component which contains at least one sulfonic acid group and may contain an azo group, e.g.

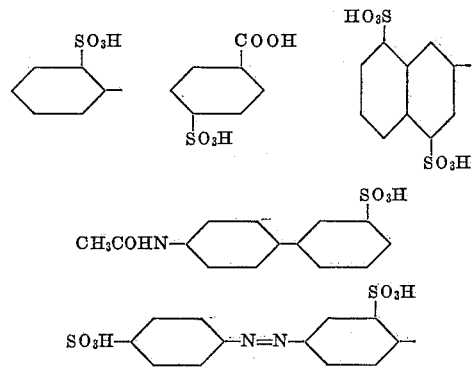

and $K_2$ for the radical of a coupling compound which couples in the adjacent position to an enolizable keto group, e.g.

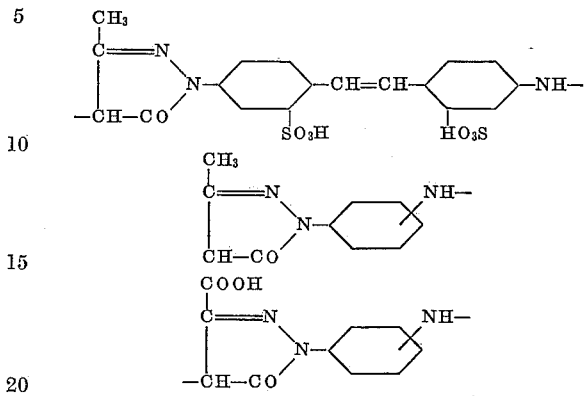

and the dyestuff itself contains at least two acid water-solubilizing groups, especially sulfonic acid groups.

(6) Metal complex compounds of monoazo dyestuffs having at least two acid-solubilizing groups and at least one group of the Formula I.

Suitable metal atoms are chromium, cobalt, nickel, and copper atoms, the last-named being preferred.

The choice of diazo components for building dyestuffs of this type includes 2-amino-1-hydroxybenzenes, 1-amino-2-hydroxy- and 2-amino-1-hydroxynaphthalenes, and 2-aminobenzene-1-carboxylic acids. Examples of suitable coupling compounds are 1-(amino) aryl - 5 - pyrazolones and aminohydroxynaphthalenesulfonic acids.

The dihalogenopyrimidine radical may be attached to the coupling compound, for instance in the following combination:

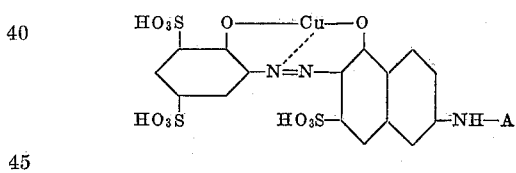

or alternatively to the diazo component, e.g.:

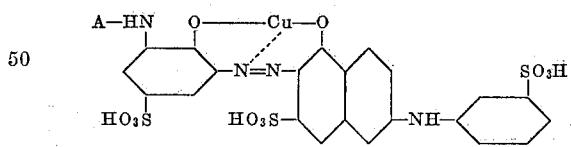

Naturally 2:1 metal complexes as well as 1:1 complexes can be produced. The former contain preferably chromium or cobalt metal atoms.

II. ANTHRAQUINONE DYESTUFFS

The aminoanthraquinones employed in this process contain at least two sulfonic acid groups.

Their condensed amino group is attached to the anthraquinone radical through a bridge member, for example an aromatic nucleus. The anthraquinone dyestuffs may conform, for example, to the following general formula.

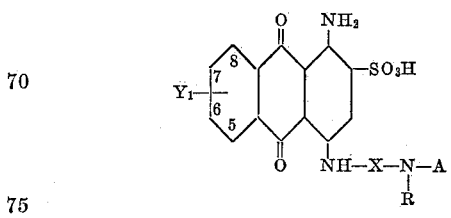

wherein: A and R possess the above-mentioned meanings,
X stands for a bridge member which may contain water-solubilizing groups, e.g.

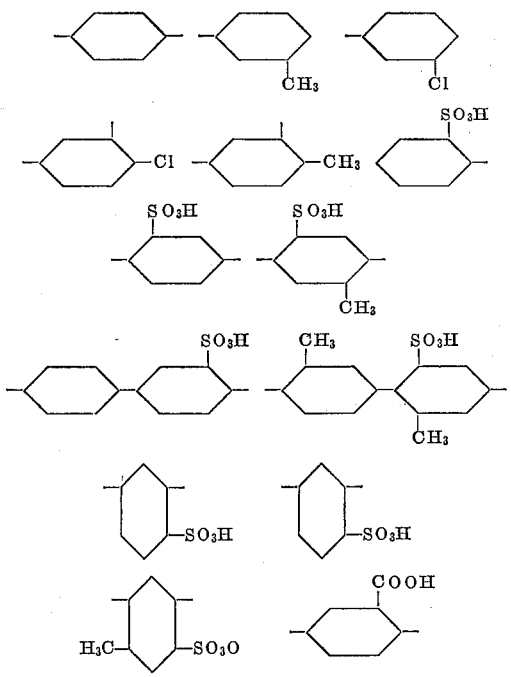

and $Y_1$ for hydrogen, halogen or a sulfonic acid group, of which the halogen atom can occupy the 6 or 7 position and the sulfonic acid group one of the positions 5, 6, 7 or 8.

III. PHTHALOCYANINE DYESTUFFS

The aminophahalocyanine dyestuffs which are condensed with a 2,4-dihalo-5-halomethylpyrimidine of the Formula II contain at least two water-solubilizing groups, —SO$_3$H or SO$_2$—NH$_2$, and may have, for example, the following general formula:

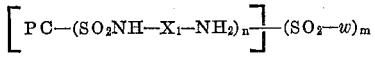

Here PC represents the radical of a phthalocyanine and $X_1$ an aliphatic, cycloaliphatic or aromatic divalent radical, while $n$ stands for one of the intergers 1, 2, or 3, and $m$ likewise for 1, 2 or 3 and $w$ —OH or —NH$_2$.

These aminophthalocyanine dyestuffs are obtained according to the known methods by the reaction of phthalocyanines containing sulfonic acid chloride groups in the 3 or 4 positions of the benzene nuclei with suitable aliphatic, cycloaliphatic or aromatic diamines or with aliphatic, cycloaliphatic or aromatic monoamines which contain a substituent capable of conversion into the amino group. In the majority of cases the yield consists of a mixture of products at various stages of condensation.

2,4-dihalo-5-halomethylpyrimidines conforming to the present definition are e.g. 2,4-dibromo-5-bromomethylpyrimidine, 2,4-dibromo-5-bromomethyl-6-methylpyrimidine, 2,4-dichloro-5-bromomethylpyrimidine, 2,4-dichloro-5-bromomethyl-6-methylpyrimidine, and preferably 2,4-dichloro - 5 - chloromethylpyrimidine and 2,4-dichloro-5-chloromethyl-6-methylpyrimidine.

The reaction of the compounds or water-soluble dyestuffs used as starting products with the 2,4-dihalo-5-halomethylpyrimidines of the Formula II is carried out preferably in aqueous medium. The halide can be employed as such in concentrated form or in solution in an organic solvent. Solvents specially suitable for the halopyrimidines are acetone, benzene, chlorobenzene and toluene.

The reaction temperature is varied, e.g. between 20 and 100° C., to suit the reactivity of the individual starting products. If temperatures higher than about 40° C. are necessary it is advisable to work in vessels equipped with reflux condensers in view of the volatility in steam of the halogenopyrimidines.

The reaction is conducted in weakly alkaline, neutral to weakly acid medium, preferably in the pH-range of 9 to 3. To neutralize the halogen halide formed, an acid-binding agent, e.g. sodium acetate, is added to the solution at the beginning of the reaction, or alternatively small amounts of sodium or potassium carbonate are added in solid powder form or as an aqueous solution during the course of the reaction. Aqueous solutions of sodium or potassium hydroxide are also suitable as neutralizing agents. The addition of small amounts of a wetting or emulsifying agent to the reaction mixture can accelerate the rate of reaction.

In both modes of operation of the process the reaction is conducted in such a manner that only the halogen atom of the halomethyl group reacts with an exchangeable hydrogen atom.

On completion of the condensation or coupling reaction, the solution or suspension may be neutralized if desired, and the final pyrimidine dyestuff is then salted out with sodium or potassium chloride or precipitated with acid and filtered with suction, washed and dried.

Since they contain at least two water-solubilizing groups in their molecule, the dyestuffs of the invention possess good solubility in water, good stability in printing pastes and padding liquors, good compatibility to salts and hard water; they are practically insensitive to heavy metals such as copper, iron and chromium and reserve cellulose—2½—and triacetate, polyester fibers such as polyethylene terephthalate, polyvinyl chloride and polyvinyl acetate fibers, polyacrylonitrile fibers and polyalkylene fibers such as polyethylene and polypropylene fibers.

The water-soluble dyestuffs of the invention which contain at least one group of the Formula I possess a very good reactivity with vegetable fibers, e.g. cotton and linen, regenerated cellulose e.g. viscose filament and staple fibers, cuprammonium rayon; animal fibers such as wool and silk, and synthetic polyamide fibers such as nylon 66 and nylon 6. Therefore they are suitable for the dyeing, padding and printing of fibers of animal origin, e.g. wool and silk, synthetic polyamide fibers, e.g. nylon, leather, cellulosic fibers, e.g. cotton and linen, fibers of regenerated cellulose, e.g. viscose filament and staple fibers and cuprammonium rayon, and mixtures of these fibers. The optimum conditions of application vary with the type of fiber and the dyestuffs employed.

Animal fibers and synthetic polyamide fibers are preferably dyed or, in printing, fixed in acid, neutral or weakly alkaline medium, e.g. in presence of acetic acid, formic acid, sulfuric acid, ammonium sulfate, sodium metaphosphate, etc. Dyeing can also be carried out in an acetic acid to neutral bath in presence of levelling agents, e.g. polyoxethylated fatty amines or mixtures of these and alkylpolyglycol ethers; on completion of dyeing the bath is adjusted to the neutral or weakly alkaline region by the addition of small amounts of an agent of alkaline reaction, e.g. ammonia, sodium bicarbonate, sodium hydroxide, etc., or compounds which react alkaline on heating, e.g. hexamethylene tetramine or urea. The goods are subsequently rinsed well and, if necessary soured with a little acetic acid.

In the dyeing and printing of animal and synthetic polyamide fibers the linkage formed between the dyestuff molecule and the fiber is often less pronounced, owing to the fact that some of the dyestuffs by virtue of their acidic character possess affinity for the fiber. However, the dyeings and prints on wool, silk and synthetic polyamide fibers possess good fastness to light, washing, water, milling, perspiration, crocking and organic solvents.

The dyeing, padding and printing or fixation of the dyestuff on cellulosic fibers is carried out to best advantage in alkaline medium, e.g. in presence of sodium bicarbonate, sodium carbonate, sodium hydroxide solution, sodium metasilicate, sodium borate, trisodium phosphate, ammonia, etc. To preclude reduction effects in dyeing, padding or printing it is often of advantage to employ a mild oxidizing agent, e.g. sodium 1-nitrobenzene-3-sulfonate. Fixation of the dyestuffs on cellulosic fibers as well as generally accomplished with heating. But it is also possible to obtain a good fixation of the dyestuff on cellulosic fibers by storing, e.g. at room temperature or at 30–40° C., the pad-dyeings obtained with a padding liquor containing a relatively strong alkali, preferably sodium silicate or sodium hydroxide.

The addition of certain quaternisable amines such as trimethylamine, triethylenediamine or of asymmetric dimethylhydrazine or N-aminopyrrolidine, preferably in stoichiometric amounts, accelerates the fixation of the dyestuff on the fiber, so that the fixation temperature can be lowered and/or the fixation time shortened and/or the alkalinity reduced.

The dyeings and prints on cellulosic fibers are especially notable for their excellent wet fastness, e.g. fastness to washing, water, sea-water, perspiration, soda boiling, crocking acid and alkaline hydrolytic influences and organic solvents (alcohols, ketones, aromatic hydrocarbons, halogenated aliphatic and aromatic hydrocarbons, pyrimidine, etc.), which are a consequence of the stable chemical linkage formed between the dyestuff molecule and the cellulose molecule. Often the entire amount of dyestuff applied does not take part in the chemical reaction with the fiber. In such cases the portion of unreacted dyestuffs is removed from the fiber by suitable treatments, e.g. rinsing, washing and/or soaping, if necessary at higher temperatures. For this purpose, soap or synthetic detergents can be used, e.g. alkylarylsulfonates such as (dodecylbenzenesulfonates), sodium alkylsulfates such as sodium lauryl sulfate, optionally sulfated or carboxymethylated alkylpolyglycol ethers and mono- and dialkylphenylpolyglycol ethers. Owing to their good solubility in water the new dyestuffs do not stain the unprinted areas in prints produced with them.

In the following examples the parts and percentages are by weight and the temperatures in degrees centigrade.

*Example 1*

Moist copper phthalocyaninetetrasulfonic acid chloride—obtained from 57.6 parts of copper phthalocyanine—is stirred into 300 parts of ice and 200 parts of water. 15 parts of 1-amino-3-acetylaminobenzene are added to the suspension and its pH value adjusted to 7 with sodium hydroxide solution. After the addition of 50 parts of sodium bicarbonate the mass is stirred for 24 hours and then heated to 80° in the course of 1 hour. In order to hydrolyze the acetylamino group 250 parts of 35% hydrochloric acid are added and the resulting suspension is heated at 85–90° for 3 hours. The precipitate is then filtered off and washed with 1000 parts of 1% hydrochloric acid. The filter cake is stirred into 1000 parts of water. The suspension is neutralized with sodium hydroxide solution to a pH value of 7 and then heated to 70–75°. 22 parts of 2,4-dichloro-5-chloromethyl-6-methyl-pyrimidine are added and the pH value is maintained at 6–7 by the addition of sodium hydroxide solution.

As soon as no more sodium hydroxide is consumed, the dyestuff is salted out, filtered off and dried at 60–70° with vacuum. A dark blue powder is obtained which dyes cotton and regenerated cellulosic fibers in turquoise shades fast to light, washing and perspiration.

Mercerised cotton can be printed with a paste consisting of:

20 parts of dyestuff,
100 parts of urea,
410 parts of water,
450 parts of 3% sodium alginate thickening,
10 parts of sodium bicarbonate,
10 parts of sodium 1-nitrobenzene-3-sulfonate
―――――
1000 parts The print is dried, steamed for 5 minutes at 100–105°, rinsed in cold and warm water, soaped, rinsed again and dried. A brilliant turquoise print with good wet fastness properties is obtained.

When the 15 parts of 1-amino-3-acetylaminobenzene are replaced by 11 parts of 1-amino-2-acetylamino-ethane or when the 22 parts of 2,4-dichloro-5-chloromethyl-6-methylpyrimidine are replaced by the equivalent amount of 2,4-dibromo-5-bromomethyl-6-methyl-pyrimidine and the procedure of this example is followed, a dyestuff with similar properties is obtained.

The copper phthalocyaninetetrasulfonic acid chloride is produced as follows:

57.6 parts of copper phthalocyanine are dissolved in 270 parts of chlorosulfonic acid. The solution is heated at 145° for 3 hours and then allowed to cool to 75–80°. 33.5 parts of thionyl chloride are dropped in the course of about 1 hour, the temperature being maintained at 70–75°. After a further 3 hours' stirring at this temperature the mass is cooled to room temperature and poured on to 1500 parts of ice. The precipitated copper phthalocyaninetetrasulfonic acid chloride is filtered off, washed with 1% hydrochloric acid and employed as moist filter cake.

*Example 2*

89.6 parts of copper phthalocyanine-4,4', 4'', 4'''-tetrasulfonic acid are entered in 400 parts of chlorosulfonic acid and mixture heated for 1 hour at 120°. After cooling to 70–75° 90 parts of thionylchloride are slowly dropped in and stirring continued for 3 hours at 75–80°. The mass is charged on to ice and the sulfonic acid chloride isolated by filtration. The filter cake is then stirred into 400 parts of ice and 400 parts of water. 20 parts of 1,3-diaminobenzene-4-sulfonic acid are strewn in and the pH value of the mixture adjusted to 7 with sodium hydroxide solution. After the addition of 50 parts of sodium bicarbonate the mass is stirred for 24 hours at normal temperature and then the temperature is increased to 60°. By the addition of hydrochloric acid the dyestuff intermediate is precipitated. It is filtered off and washed well with dilute hydrochloric acid. The filter cake is dissolved neutral in 1000 parts of water with the addition of sodium hydroxide solution, then 22 parts of 2,4-dichloro-5-chloromethyl-6-methylpyrimidine are added. The solution is heated at 70–80° with gradual addition of dilute sodium hydroxide solution to maintain the pH at 6–7. As soon as no further sodium hydroxide is consumed, the condensation reaction is completed. The dyestuff is salted out, filtered off, dried with vacuum at 70° and ground. It is a dark blue powder that dissolves in water with a turquoise-blue coloration.

A similar dyestuff is obtained when in place of the 20 parts of 1,3-diaminobenzene-4-sulfonic acid, 22 parts of 1-amino-4-methylaminobenzene-3-sulfonic acid are used.

*Example 3*

27.4 parts of sodium 1-amino-4-(4'-methylamino)-phenylamino-anthraquinone-2,2-disulfonate are dissolved in 500 parts of water at 65° and the pH-value is adjusted to 6. 11 parts of 2,4-dichloro-5-chloromethyl-6-methyl-pyrimidine are added and the whole stirred for 4 hours at 65°. The pH value of the mixture falls rapidly owing to the hydrogen chloride set free by condensation; it is maintained at 5 to 5.5 by dropwise addition of dilute sodium hydroxide solution. When chromatographic analysis of a sample of the reaction mixture no longer indicates the presence of starting material, the mass is adjusted to pH 7.2 with sodium hydroxide solution. 25 parts of potassium chloride are added and it is allowed to cool. The precipitated dyestuff is filtered off, washed with 5% potassium chloride solution and dried with vacuum at 50–60°. A dark blue powder is obtained which dissolves in water with a greenish blue coloration and dyes cotton and fibers of regenerated cellulose in greenish blue shades fast to light, washing and perspiration.

When the 27.4 parts of sodium 1-amino-4-(4'-methylamino)-phenylaminoanthraquinone - 2,2' - disulfonate are replaced by an equivalent amount of potassium 1-amino-4 - (4' - methylamino)-phenylaminoanthraquinone-2,7,2'-trisulfonate, or the 11 parts of 2,4-dichloro-5-chloromethyl-6-methylpyrimidine by the equivalent amounts of 2,4-dichloro-5-chloromethylpyrimidine or 2,4-dibromo-5-bromomethylpyrimidine blue dyestuffs with similar properties are obtained.

*Example 4*

28.2 parts of potassium 1-amino-4-(3'-amino)-phenylamino-anthraquinone-2,4'-disulfonate are dissolved in 600 parts of water at 85°–90° and the pH value is adjusted to 4.5. 12 parts of 2,4-dichloro-5-chloromethyl-6-methylpyrimidine are added and the mass is stirred at 85–90° until the reaction is completed, the pH value being maintained at 4.5 to 5.5 by dropwise addition of dilute sodium hydroxide solution. When condensation is completed, the pH of the mixture is brought to 7.3 with sodium hydroxide solution. 100 parts of potassium chloride are added and the mass allowed to cool to room temperature. The precipitated dyestuff is filtered off and dried with vacuum at about 60°. A dark blue powder is obtained which dissolves in water to give brilliant reddish blue solutions. It dyes cotton and fibers of regenerated cellulose in blue shades fast to light, washing and perspiration.

Cotton sateen is padded with a cold 2% solution of the dyestuff obtained as described above, at an expression (pick-up) of about 75%. The padded fabric is dried and the dyestuff fixed by treating the goods for about 1 hour with agitation in a developing bath at 90° containing 200 parts of sodium sulfate and 10 parts of sodium carbonate per 1000 parts of the solution. The liquor ratio of this bath may vary from 1:10 to 1:50. After fixation, the fabric is thoroughly rinsed with cold water, soaped for 20 minutes at the boil, rinsed again and dried. A reddish blue dyeing of good light and wet fastness is obtained.

*Example 5*

43.1 parts of sodium 1-amino-4-(3'-amino)-phenylamino-anthraquinone-2-sulfonate are dissolved at 60° in 1000 parts of water. After the addition of 22 parts of 2,4-dichloro-5-chloromethyl-6-methylpyrimidine the mass is stirred at 60–65° and the pH kept at 5.5 to 6.0 by the dropwise addition of sodium hydroxide solution. In the course of the reaction the formed dyestuff is partially precipitated. When no more alkali is consumed the dyestuff is completely salted out, filtered off, washed with a dilute sodium sulfate solution and well dried.

The dry powder obtained is dissolved at 5° in 300 parts of oleum with a $SO_3$ content of 10%. The solution is stirred for 2 hours at about 20–25° and then poured onto 410 parts of ice. The precipitated dyestuff—in the form of the free acid—is filtered off and well pressed in order to eliminate the sulfuric acid solution as completely as possible. The filter cake is pasted with a little water, sodium hydroxide solution is added to obtain the pH-value of 7 and it is then dried. After grinding a dark blue powder is obtained which dissolves in water with a reddish blue coloration and yields on fibers of natural or regenerated cellulose, wool or synthetic polyamide fibers pad-dyeings and prints fast to light and to wet treatments.

*Example 6*

36.3 parts of sodium 1-amino-8-hydroxynaphthalene-3,6-disulfonate are added to 250 parts of water and 40 parts of crystallized sodium acetate. With stirring, 21.2 parts of 2,4-dichloro-5-chloromethyl-6-methylpyrimidine are added to the solution, which is then heated to 80° and maintained at this temperature overnight with constant stirring. Next morning the reaction is completed. The mass is cooled to 10°, rendered weakly alkaline with 20% sodium carbonate solution and 40 parts of sodium bicarbonate are added. To this reaction mixture is added a diazo solution prepared in the normal way with 17.3 parts of 1-aminobenzene-2-sulfonic acid, sodium nitrite and hydrochloric acid. The temperature of the coupling mass is maintained at 5–10°. After about 2 hours coupling is completed and the dyestuff formed goes into solution. It is salted out with potassium chloride, filtered off, and the precipitate dried at 50–60° with vacuum. On drying, a red-brown powder is obtained which dissolves in water with a blue-red coloration. On cellulosic fibers the dyestuff gives very bright dyeings and prints with outstanding wet fastness properties.

For roller prints on mercerized cotton the dyestuff can be applied in a paste of the following composition:

30 parts of dyestuff,
100 parts of urea,
400 parts of water,
450 parts of 3% sodium alginate thickening,
10 parts of sodium bicarbonate,
10 parts of sodium 1-nitrobenzene-3-sulfonate 1000 parts The printed fabric is dried, fixed for about 5 minutes at 150°, rinsed in cold and warm water, soaped, rinsed again and dried. A brilliant blue-red print with excellent wet fastness properties is obtained.

When in place of the 21.2 parts of 2,4-dichloro-5-chloromethyl-6-methylpyrimidine, the corresponding amounts of 2,4-dibromo-5-bromo-methylpyrimidine, 2,4-dibromo-5-bromomethyl-6-methylpyrimidine or 2,4-dichloro-5-chloromethylpyrimidine are employed, dyestuffs with very similar fastness properties are obtained.

*Example 7*

46.5 parts of the disodium salt of the aminoazo dyestuff obtained by coupling diazotized 2-aminonaphthalene-4,8-disulfonic acid with 1-amino-3-methylbenzene in acid medium are stirred into 300 parts of water. 40 parts of crystallized sodium acetate are added, the mass is heated to 80° and 212 parts of 2,4-dichloro-5-chloromethyl-6-methylpyrimidine are added with stirring. Stirring is continued for about 15 hours at 80°, upon which the new dyestuff is precipitated. The mass is allowed to cool to room temperature until the precipitate is completely formed and it is then filtered off, washed with sodium chloride solution and a little acetone, and finally dried with vacuum at 50–60°.

The new dyestuff is a yellow powder which dissolves in water with a reddish yellow coloration. When printed on cotton or rayon according to the recipe given in Example 6, fixed by heat treatment for 5 minutes at 150°, well rinsed and soaped, it gives a bright orange print which possesses excellent light and wet fastness.

When in place of the 21.2 parts of 2,4-dichloro-5-chloromethyl-6-methylpyrimidine, equivalent amounts of 2,4-dichloro-5-chloromethyl- or -5-bromomethylpyrimidine, 2,4-dibromo-5-bromomethylpyrimidine or 2,4-dibromo-5-bromomethyl-6-methylpyrimidine are employed and the same procedure as above is adopted, the dyestuffs obtained have very similar fastness properties.

*Example 8*

40.7 parts of the monoazo dyestuff obtained by coupling diazotized 1-aminobenzene-2-sulfonic acid with 1-amino-8-hydroxy-naphthalene-3,6-disulfonic acid are stirred into 800 parts of water. The pH of the solution is adjusted to 5 and it is heated to 80°. With stirring 21.2 parts of 2,4-dichloro-5-chloromethyl-6-methylpyrimidine are added and stirring is continued for 3 hours at 80°, the pH value being maintained at 5 by dropwise addition of a dilute sodium hydroxide solution. On condensation, the new dyestuff is precipitated by the addition of sodium chloride, filtered off, and the paste washed with dilute sodium chloride solution and dried with vacuum at 60°. The dyestuff obtained is identical with that of Example 6.

Example 9

94 parts of 1,3-diaminobenzene-6-sulfonic acid are dissolved in 550 parts of water at about 50° with an addition of a sodium hydroxide solution. 106 parts of 2,4-dichloro-5-chloromethyl-6-methylpyrimidine are added and the reaction mixture stirred for several hours at 50–50° with dropwise addition of a dilute sodium hydroxide solution to maintain a pH value of 5–6. On completion of condensation the solution is stirred for a few hours at room temperature and the crystalline reaction product then filtered off. It can be dried in vacuo at 70–80°.

38.5 parts of the sodium-1-amino-3-(2',4'-dichloro-6'-methypyrimidyl-5'-methylene-amino) - benzene-6-sulfonate produced as described above are dissolved in 1000 parts of water with slight heating with the addition of a dilute sodium carbonate solution to give a weekly alkaline solution. To this is added a solution of 7 parts of sodium nitrite in 30 parts of water. The mixture is run into 30 parts of 30% hydrochloric acid and 50 parts of ice, fresh ice being added to keep the temperature below 5°. After stirring for some time any excess of nitrous acid indicated is destroyed by an addition of amidosulfonic acid.

The diazotizing mass is run slowly into a neutral solution of 34.5 parts of sodium 1-(2',5'dichloro)-phenyl-3-methyl-5-pyrazolone-4'-sulfonate in 300 parts of water with a dilute sodium carbonate solution added dropwise to maintain the coupling mixture neutral. After stirring for some time the mass is heated to 75'–80° and the dyestuff precipitated in crystalline form by slow addition of potassium chloride. After filtering off, the press cake is dried in vacuo at 80–90°. The ground dyestuff is a brown powder which dissovles in water with a yellow coloration.

A spun viscose rayon fabric is padded at 35–50° with a solution of 15 parts of the above-discribed dyestuff, 20 parts of calcined sodium sulfate and 30 parts of potassium carbonate in 1000 parts of water to give an expression or pickup of 70 to 90% over the dry weight. The fabric is rolled up and rotated in a condensing chamber for 5 to 8 hours at 80–90° and at constant moisture content. It is then washed well in cold and warm water, soaped at the boil for about 20 minutes, rinsed again and dried. The yellow dyeing thus obtained is extremely fast to light and wet treatments.

Example 10

The diazotizing mass obtained from 38.5 parts of sodium 1-amino-3-(2',4'-dichloro-6'-methylpyrimidyl-5'-methylene-amino)-benzene-6-sulfonate according to the details of Example 9 is run slowly into a neutral solution of 53.8 parts of sodium 1-(2',4'-dichloro-6'-methylpyrimidyl-5'-methyleneamino) - 8 - hydroxynaphthalene-3,6-disulfonate obtained according to the details of Example 6 in 600 parts of water at about 5–10°. A concentrated sodium carbonate solution is run in simultaneously to give the coupling mass a constant neutral to weakly acid reaction. On completion of coupling the mass is heated to 80–90° and the dyestuff precipitated with common salt. After filtering off, drying and grinding a brownish red powder is obtained.

A mercerised cotton fabric is padded with a solution of 30 g./l. of the dyestuff of this example, 3 g./l. of sodium hydroxide solution of 66° Tw. (36° Bé.) and 5 g./l. of sodium 1 - nitrobenzene-3-sulfonate at 20–40° and squeezed to give an increase of 100% on the dry weight. It is fixed by treatment for 2–4 hours at 80–85° in a conditioning chamber at constant moisture content, and subsequently washed well in cold and hot water and dried. A blue-red dyeing with very good wet fastness properties and good light fastness is obtained.

Example 11

48.4 parts of the monoazo dye obtained by alkaline coupling of diazotized 2-amino-1-hydroxy-4-nitrobenzene with 1-amino-8-hydroxynaphthalene-3,6-disulfonic acid are suspended in 300 parts of water at 75°. Over 30 minutes a solution of 14.5 parts of cobalt sulfate in 40 parts of water is dropped into the suspension. The pH value of the reaction mass is maintained between 5.0 and 6.0 by simultaneous dropwise addition of dilute sodium carbonate solution. After the addition of the cobalt sulfate solution the mass is stirred for a further hour at 75°. The dye is then precipitated by the addition of sodium chloride and filtered off.

The cobalt complex compound is dissolved in 300 parts of water at 70°. 21 parts of 2,4-dichloro-5-chloromethyl-6-methylpyridine are added and the solution stirred for a few hours at the same temperature. The pH value is held at 4.0–5.0 by the dropwise addition of dilute sodium carbonate solution. On completion of condensation the dye is precipitated at 70° by the addition of sodium chloride, filtered off and dried.

By printing on cotton according to the printing procedure described in Example 1 a navy blue print with excellent light and wet fastness is obtained.

A mercerized cotton fabric is padded at 25° C. with a padding liquor of the composition 30 grams per liter of the above dyestuff
150 grams per liter of calcined sodium sulfate
30 grams per liter of sodium metasilicate
15 ml. per liter of 30% sodium hydroxide solution and squeezed to a pick-up of 75% over the dry weight. The fabric is then rolled up, wrapped in a plastic foil and stored for 4 hours at room temperature in order to fix the dyestuff on the cotton. The fixed dyeing is rinsed with cold and with hot water, soaped for 15 minutes at the boil with a 0.3% soap solution in distilled water, rinsed again and dried. A navy blue dyeing with good light fastness and excellent wet fastness properties is obtained.

In the following table are listed the chemical names of amino dyestuffs free from reactive groups and corresponding to the reactive dyestuffs of the invention which contain a grouping of the formula

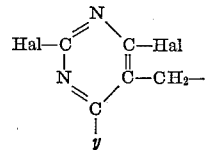

wherein:
Hal is chlorine or bromine and
y is hydrogen or methyl, and were obtained according to the details given in Examples 1 to 11. In these names the amino group or groups to which the above grouping is attached, are italicized.

12. 1-amino-4-(3'-*amino*)-phenylamino-anthraquinone-2,6,4'-trisulfonic acid.
13. 1-amino-4-(2',4',6'-trimethyl-3'-*amino*)-phenyl-amino-anthraquinone-2,6-disulfonic acid.
14. 1-amino-4-(2',4',6'-trimethyl-3'-*amino*)-phenyl-amino-anthraquinone-2,5'-disulfonic acid.
15. 1-*amino*-7-(4'-methyl)-phenylazo-8-hydroxy-naphthalene-4,6-disulfonic acid.
16. 1-hydroxy-2-(3'-*amino*)-phenylazo-naphthalene-3,6,6'-trisulfonic acid.
17. 1-amino-4-[4'-(4''-*amino*)-phenyl]-phenylamino-anthraquinone-2,6,3''-trisulfonic acid.
18. Copperphthalocyanine-trisulfonic acid amide-sulfonic acid-(4'-*amino*)-phenylamide.
19. 1-*amino*-7-2'-methyl)-phenylazo-8-hydroxynaph-thalene-3,6,5'-trisulfonic acid.
20. 1-*amino*-7-(2'-methyl)-phenylazo-8-hydroxy-naphthalene-3,6,4'-trisulfonic acid.

21. 1-*amino*-7-(4'-methoxy)-phenylazo-8-hydroxy-naphthalene-3,6,6'-trisulfonic acid.
22. 1-*amino*-7-(3'-acetylamino)-phenylazo-8-hydroxy-naphthalene-3,6,6'-trisulfonic acid.
23. 1-*amino*-7-(3'-*amino*)-phenylazo-8-hydroxy-naphthalene-3,6,6'-trisulfonic acid.
24. 1-*amino*-7-(3'-*amino*-4'-methyl)-phenylazo-8-hydroxy-naphthalene-3,6,6'-trisulfonic acid.
25. 1-*amino*-7-(3'-trifluoromethyl)-phenylazo-8-hydroxy-naphthalene-3,6,6'-trisulfonic acid.
26. 1-*amino*-7-[4'-(6''-methyl)-benzothiazolyl-(2'')]-phenylazo-8-hydroxy-naphthalene-3,6,x''-trisulfonic acid.
27. 2-(4'*amino*)-phenylazo-naphthalene-4,8-disulfonic acid.
28. 2-(4'-*amino*-2'-acetylamino)-phenylazo-naphthalene-4,8-disulfonic acid.
29. 2-(4'-*amino*-2'-sulfoacetylamino)-phenylazo-naphthalene-4,8-disulfonic acid.
30. 2-(4'-*amino*-2'-methyl)-phenylazo-naphthalene-5,7-disulfonic acid.
31. 2-(4'-*amino*-3'-carboxy)-phenylazo-naphthalene-4,8-disulfonic acid.
32. 1-phenyl-3-methyl-4-(3''-*amino*)-phenylazo-5-pyrazolone-2',6''-disulfonic acid.
33. 1-[(4''-acetylamino)-stilbenyl - (4')] - 3 - methyl-4-3'''-*amino*) - phenylazo - 5-pyrazolone-2',2'',6'''-trisulfonic acid.
34. 1-(2',5'-dichloro)-phenyl-3-methyl - 4 - [4'''-*amino*)-phenyl]-phenylazo-5-pyrazolone-4',2''-disulfonic acid.
35. 1-phenyl-3-methyl-4-(6''-*amino*-naphthyl-2''-azo)-5-pyrazolone-3',4'',8''-trisulfonic acid.
36. 1-naphthyl-(2')-3-methyl-4-(4''-*amino*)-phenylazo-5-pyrazolone-5',7',2''-trisulfonic acid.
37. 1-(2',5'-dichloro)-phenyl-3-methyl-4-(4''-*amino*)-phenylazo-5-pyrazolone-4',2''-disulfonic acid.
38. 1-(4'-*amino*phenyl)-3-methyl-4-phenylazo-5-pyrazolone-2'',4''-disulfonic acid.
39. 1-(2',5'-dichloro)-phenyl-3-methyl-4-4''-(4'''-*amino*-2'''-methyl) - phenyl - 3''-methyl]-phenylazo-5-pyrazolone-4',6''-disulfonic acid.
40. 1-naphthyl-(2')-3-methyl-4-(3'-*amino*)-phenylazo-5-pyrazolone-4',8',6''-trisulfonic acid.
41. 1-phenyl-3-methyl-4-(4'''-*amino*)-phenylazo-5-pyrazolone-2',5',2''-trisulfonic acid.
42. 1-(3'-*amino*)-phenylazo-2-hydroxy-naphthalene-6,6'-disulfonic acid.
43. 1-(3'-*amino*)-phenylazo-2-hydroxy-naphthalene-8,6'-disulfonic acid.
44. 1-(3'-*amino*)-phenylazo-2-hydroxy-naphthalene-6,8,6'-trisulfonic acid.
45. 1-(3'-*amino*)-phenylazo-2-hydroxy-naphthalene-3,6,6'-trisulfonic acid.
46. 1-(3'-*amino*)-phenylazo-2-hydroxy-naphthalene-3,6,8,6'-tetrasulfonic acid.
47. 1-hydroxy-2-(3'-*amino*)-phenylazo-naphthalene-3,6'-disulfonic acid.
48. 1-hydroxy-2-(3'-*amino*)-phenylazo-naphthalene-4,6'-disulfonic acid.
49. 1-hydroxy-2-(3'-*amino*)-phenylazo-naphthalene-5,7,6'-trisulfonic acid.
50. 1-hydroxy-2-(3'-*amino*)-phenylazo-naphthalene-3,8,6'-trisulfonic acid.
51. 1-hydroxy-2-(3'-*amino*)-phenylazo-8-chloronaphthalene-3,6,6'-trisulfonic acid.
52. 1-hydroxy-2-(3'-*amino*)-phenylazo-8-acetylamino-naphthalene-3,6,6'-trisulfonic acid.
53. 1-hydroxy-2-(3'-*amino*)-phenylazo-8-(4''-chloro)-benzoylamino-naphthalene-3,6,6'-trisulfonic acid.
54. 1-hydroxy-2-(3'-*amino*)-phenylazo-6-propionylamino-naphthalene-3,6'-disulfonic acid.
55. 1-hydroxy-2-(3'-*amino*)-phenylazo-7-propionylamino-naphthalene-3,6'-disulfonic acid.
56. 1-hydroxy-2-(3'-*amino*)-phenylazo-7-*amino*-naphthalene-3,6'-disulfonic acid.
57. 1-hydroxy-2-(3'-*amino*-4'-methyl)-phenylazo-naphthalene-4,6'-disulfonic acid.
58. 1-hydroxy-2-(3'-*amino*-4'-methyl)-phenylazo-naphthalene-3,6,6'-trisulfonic acid.
59. 1(4'-*amino*)-phenylazo-2-hydroxy-naphthalene-8,2'-disulfonic acid.
60. 1-(4'-*amino*)-phenylazo-2-hydroxy-naphthalene-6,8,2'-trisulfonic acid.
61. 1-hydroxy-2-(4'-*amino*)-phenylazo-naphthalene-3,2'-disulfonic acid.
62. 1-hydroxy-2-(4'-*amino*)-phenylazo-8-acetylamino-naphthalene-3,5,2'-trisulfonic acid.
63. 1-hydroxy-2-(4'-*amino*)-phenylazo-8-(3''-chloro)-benzoyl-amino-naphthalene-3,5,2'-trisulfonic acid.
64. 1-[4'-(4''-*amino*)-phenyl]-phenylazo-2-hydroxy-naphthalene-6,8,2'-trisulfonic acid.
65. 1-hydroxy-2-[4'-(4''-*amino*)-phenyl]-phenylazo-naphthalene-3,6,2'-trisulfonic acid.
66. 1-hydroxy-2-[4'-(4''-*amino*)-phenyl]-phenylazo-8-chloronaphthalene-3,6,2'-trisulfonic acid.
67. 1-hydroxy-2-[4'-(4''-*amino*-2''-methyl)-phenyl-3'-methyl]-phenylazo-napthalene-4,6'-disulfonic acid.
68. 1-hydroxy-2-[4'-(4''-*amino*-2''-methyl)-phenyl-3'-methyl]-phenylazo-napthalene-3,6,6'-trisulfonic acid.
69. 1-hydroxy-2-[4'-(4''-*amino*-2''-methyl)-phenyl-3'-methyl]-phenylazo-naphthalene-3,8,6'-trisulfonic acid.
70. 1-[4'-(4''-*amino*-2''-methyl)-phenyl-3'-methyl]-phenylazo-2-amino-8-hydroxy-naphthalene-6,6'-disulfonic acid.
71. 1-[4'-(4''-*amino*-2''-methyl)-phenyl-3'-methyl]-phenylazo-2-amino-8-hydroxy-naphthalene-3,6,6'-trisulfonic acid.
72. 1-(4'-*amino*)-naphthyl-(1')-azo-4-naphthyl-(1'')-azo-naphthalene-6(7),5''-trisulfonic acid.
73. 1-naphthyl-(1')-3-methyl-4-(6''-*amino*naphthyl-2''-azo)-5-pyrazolone-4',4'',8''-trisulfonic acid.
74. 1-phenyl-3-methyl-4-(6''-*amino*naphthyl-2''-azo)-5-pyrazolone-2',5',4'',8''-tetrasulfonic acid.
75. 1-amino-2-(4'-*amino*)-phenylazo-7-phenylazo-8-hydroxy-naphthalene-3,6,4''-trisulfonic acid.
76. 4-*amino*-4'-(4''-methoxy)-naphthyl-(1''')-azostilbene-2,2'-disulfonic acid.
77. 1-(4'-*amino*)-benzoylamino-7-phenylazo-8-hydroxy-naphthalene-3,6,2''-trisulfonic acid.
78. Copper complex compound of 1-hydroxy-2-(2'-hydroxy-5'-methyl)-phenylazo-6-*amino*-naphthalene-3,4'-disulfonic acid.
79. Copper complex compound of 1-hydroxy-2-(2'-hydroxy)-naphthyl-(1')-azo-6-*amino*-naphthalene-3,4'-disulfonic acid.
80. Copper complex compound of 1-hydroxy-2-(1'-hydroxy)-naphthyl-(2')-azo-8-*amino*-naphthalene-3,6,4',6'-tetrasulfonic acid.
81. Copper complex compound of 1-(2'-hydroxy-3'-*amino*)-phenylazo-2-hydroxy-naphthalene-6,5'-disulfonic acid.
82. Nickel complex compound of 1-hydroxy-2-(2'-hydroxy)-phenylazo-6-*amino*-naphthalene-3,3',5'-trisulfonic acid.
83. 1:2-chromium complex compound of 1-hydroxy-2-(2'-hydroxy-3'-chloro)-phenylazo-6-*amino*-naphthalene-3,5'-disulfonic acid.
84. 1:2-chromium complex compound of 1-(2'-hydroxy)-phenylazo-2-hydroxy-8-*amino*-naphthalene-5'-sulfonic acid.
85. 1:2-cobalt complex compound of 1-phenyl-3-methyl-4-(2''-hydroxy-3''-*amino*)-phenylazo-5-pyrazolone-4',5''-disulfonic acid.
86. Mixed 1:2-chromium complex compound of 1-(2'-hydroxy-3'-chloro)-phenylazo-2-hydroxy-8-acetyl-amino-naphthalene-5'-sulfonic acid and 1-hydroxy-2-(2'-hydroxy-3'-chloro)-phenylazo-6-*amino*-naphthalene-3,5'-disulfonic acid.

87. 1-amino-4-(3'-*amino*)-phenylamino-anthraquinone-2,7,4'-trisulfonic acid.
88. 1-amino-4-(3'-*amino*-6'-methyl)-phenylamino-anthraquinone-2,6,4'-trisulfonic acid.
89. 1-amino-4-(3'-*amino*-6'-methyl)-phenylamino-anthraquinone-2,7,4'-trisulfonic acid.
90. 1-amino-4-[4'-(4''-*amino*-2''-methyl)-phenyl-3'-methyl]-phenylamino-anthraquinone-2,8,5''-trisulfonic acid.
91. 1-amino-4-(4'-*methylamino*)-phenylamino-anthraquinone-2,6,2'-trisulfonic acid.
92. 1-amino-4-(3'-*methylamino*-4'-methyl)-phenylamino-anthraquinone-2,5,6'-trisulfonic acid.
93. Copperphthalocyanine-trisulfonic acid-sulfonic acid-(3'-*amino*)-phenylamide.
94. Copperphthalocyanine-trisulfonic acid amide-sulfonic acid-(3'-*amino*)-phenylamide.
95. Copperphthalocyanine-trisulfonic acid-sulfonic acid-(4'-*amino*-3'-sulfo)-phenylamide.
96. Copperphthalocyanine-disulfonic acid-disulfonic acid-(4'-*amino*-3'-sulfo)-phenylamide.
97. Copperphthalocyanine-trisulfonic acid-sulfonic acid-(2'-*amino*)-ethylamide.
98. Mixed 1:2-chromium complex compound of 1-(2'-hydroxy-5'-chloro)-phenylazo-2-hydroxy-8-acetyl-amino-naphthalene-3'-sulfonic acid and 1-hydroxy-2-(2'-hydroxy-5'-chloro)-phenylazo-6-*amino*-naphthalene-3,3'-disulfonic acid.
99. 1:2-chromium complex compound of 1-hydroxy-2-(2'-hydroxy-5'-chloro)-phenylazo-6-*amino*-naphthalene-3,3'-disulfonic acid.
100. 1:2-cobalt complex compound of 1-hydroxy-2-(2'-hydroxy-5'-chloro)-phenylazo-6-*amino*-naphthalene-3,3'-disulfonic acid.
101. 1:2-chromium complex compound of 1-(2'-hydroxy-3'-chloro)-phenylazo-2-hydroxy-8-*amino*-naphthalene-5'-sulfonic acid.
102. 1:2-cobalt complex compound of 1-hydroxy-2-(2'-hydroxy-3'-chloro)-phenylazo-6-*amino*-naphthalene-3,5'-disulfonic acid.
103. 1:2-chromium complex compound of 1-(2'-hydroxy-5'-nitro)-phenylazo-2-hydroxy-8-*amino*-naphthalene-3'-sulfonic acid.
104. 1:2-chromium complex compound of 1-(2'-hydroxy-3'-nitro)-phenylazo-2-hydroxy-8-*amino*-naphthalene-5'-sulfonic acid.
105. 1:2-chromium complex compound of 1-hydroxy-2-(2'-hydroxy-5'-nitro)-phenylazo-6-*amino*-naphthalene-3,3'-disulfonic acid.
106. 1:2-cobalt complex compound of 1-hydroxy-2-(2'-hydroxy-5'-nitro)-phenylazo-6-*amino*-naphthalene-3,3'-disulfonic acid.
107. 1:2-chromium complex compound of 1-hydroxy-2-(2'-hydroxy-3'-nitro)-phenylazo-6-*amino*-naphthalene-3,5'-disulfonic acid.
108. 1:2-cobalt complex compound of 1-hydroxy-2-(2'-hydroxy-3'-nitro)-phenylazo-6-*amino*-naphthalene-3,5'-disulfonic acid.
109. 1:2-chromium complex compound of 1-(2'-hydroxy)-phenylazo-2-hydroxy-8-*amino*-naphthalene-3,5'-disulfonic acid.
110. 1:2-chromium complex compound of 1-hydroxy-2-(2'-hydroxy-6'-nitro)-naphthyl-(1')-azo-6-*amino*-naphthalene-3,4'-disulfonic acid.
111. 1:2-cobalt complex compound of 1-hydroxy-2-(2'-hydroxy-6'-nitro)-naphthyl-(1')-azo-6-*amino*-naphthalene-3,4'-disulfonic acid.
112. Mixed 1:2-chromium complex compound of 1-(2'-hydroxy-3'-nitro)-phenylazo-2-hydroxy-8-*amino*-naphthalene-5'-sulfonic acid and 1-hydroxy-2-(2'-hydroxy-3'-chloro)-phenylazo-6-*amino*-naphthalene-3,5'-disulfonic acid.
113. 1:2-chromium complex compound of 1-hydroxy-2-(2'-hydroxy)-naphthyl-(1')-azo-6-*amino*-naphthalene-3,4'-disulfonic acid.
114. 1:2-chromium complex compound of 1-hydroxy-2-(2'-hydroxy)-phenylazo-6-*amino*-naphthalene-3-sulfonic acid-5'-sulfonic acid amide.
115. 1-hydroxy-2-(3'-*amino*)-phenylazo-naphthalene-4,6,6'-trisulfonic acid.
116. 1-hydroxy-2-(3'*amino*)-phenylazo-naphthalene-4,7,6'-trisulfonic acid.
117. 1-hydroxy-2-(3'*amino*)-phenylazo-naphthalene-3,5,6'-tetrasulfonic acid.
118. 1-hydroxy-2-(3'-*amino*)-phenylazo-naphthalene-3,6,6'-trisulfonic acid-8-sulfonic acid amide.
119. Copper complex compound of 1-hydroxy-2-(2'-hydroxy)-phenylazo-8-*amino*-naphthalene-3,6,5'-trisulfonic acid.
120. Nickel complex compound of 1-hydroxy-2-(2'-hydroxy)-phenylazo-8-*amino*-naphthalene-3,6,5'-trisulfonic acid.
121. Copper complex compound of 1-hydroxy-2-(2'-hydroxy-5'-chloro)-phenylazo-8-*amino*-naphthalene-3,6,3'-trisulfonic acid.
122. Copper complex compound of 1-hydroxy-2-(2'-hydroxy-3'-chloro)-phenylazo-8-*amino*-naphthalene-3,6,5'-trisulfonic acid.
123. Copper complex compound of 1-hydroxy-2-(2'-hydroxy-5'-methylsulfonyl)-phenylazo-8-*amino*-naphthalene-3,6-disulfonic acid.
124. Copper complex compound of 1-hydroxy-2-(2'-hydroxy)-phenylazo-8-*amino*-naphthalene-3,6-disulfonic acid-5'-sulfonic acid amide.
125. Copper complex compound of 1-hydroxy-2-(2'-hydroxy)-phenylazo-8-*amino*-naphthalene-3,5,5'-trisulfonic acid.
126. Copper complex compound of 1-hydroxy-2-(2'-hydroxy-5'-methyl-sulfonyl)-phenylazo-8-*amino*-naphthalene-3,5-disulfonic acid.
127. Copper complex compound of 1-hydroxy-2-(2'-hydroxy)-phenylazo-8-*amino*-naphthalene-3,6,3',5'-tetrasulfonic acid.
128. Copper complex compound of 1-hydroxy-(2'-hydroxy-3'-carboxy)-phenylazo-8-*amino*-naphthalene-3,6,5'-trisulfonic acid.
129. Copper complex compound of 1-hydroxy-2-(2'-hydroxy)-phenylazo-8-*amino*-naphthalene-3,5,3',5'-tetrasulfonic acid.
130. Copper complex compound of 1-hydroxy-2-(2'-hydroxy-3'-carboxy)-phenylazo-8-*amino*-naphthalene-3,5,5'-trisulfonic acid.
131. 1-amino-4-(3'-*amino*)-phenylamino-anthraquinone-2,6,4'-trisulfonic acid.
132. 1-amino-4-(3'-*amino*)-phenylamino-anthraquinone-2,4'-disulfonic acid.
133. 1-*amino*-7-phenylazo-8-hydroxynaphthalene-3,6,3'-trisulfonic acid.
134. 2-(4'-*amino*)-phenylazonaphthalene-4,6,8-trisulfonic acid.
135. 1-(2',5'-dichloro)-phenyl-3-methyl-4-(3''-*amino*)-phenylazo-5-pyrazolone-4',6''-disulfonic acid.
136. 1-*amino*-7-phenylazo-8-hydroxynaphthalene-3,6,2''-trisulfonic acid.
137. 1-amino-2-(4'-isoamyl)-phenoxy-4-(4''-*amino*)-phenylamino-anthraquinone-2',2''-disulfonic acid.
138. 1-(2'-chloro)-phenyl-3-methyl-4-(3''-*amino*)-phenylazo-5-pyrazolone-5',6''-disulfonic acid.
139. 1-(2'-chloro-6'-methyl)-phenyl-3-methyl-4-(3''-*amino*)-phenylazo-5-pyrazolone-4',6''-disulfonic acid.
140. 1-hydroxy-2-(3'-*amino*)-phenylazo-napthalene-4,8,6'-trisulfonic acid.
141. 1-hydroxy-2-phenylazo-7-*amino*-naphthalene-3,2'-disulfonic acid.
142. 1-amino-4-(4'-*amino*)-phenylamino-anthraquinone-2,6,3'-trisulfonic acid.
143. 4-*amino*-4'-(4''-methoxy)-phenylazo-1,1'-stilbene-2,2'-disulfonic acid.
144. 1-*amino*-7-(4'-methyl)-phenylazo-8-hydroxynaphthalene-3,6,6'-trisulfonic acid.

145. 1-*amino*-7-(4-chloro)-phenylazo-8-hydroxynaphthalene-3,6,6'-trisulfonic acid.
146. 1*amino*-7-(4-phenylazo)-phenylazo-8-hydroxynaphthalene-3,6,2',4''-tetrasulfonic acid.
147. 1-*amino*-7-(4'-acetylamino)-phenylazo-8-hydroxynaphthalene-4,6,6'-trisulfonic acid.
148. 1-*amino*-7-(3',4'-dichloro)-phenylazo-8-hydroxynaphthalene-4,6,6'-trisulfonic acid.
149. 1-*amino*-7-(3'-methyl-4'-chloro)-phenylazo-8-hydroxynaphthalene-4,6,6'-trisulfonic acid.
150. 1-*amino*-7-((2',4'-dimethyl)-phenylazo-8-hydroxynaphthalene-4,6,6'-trisulfonic acid.
151. 1-*amino*-7-phenylazo-8-hydroxynaphthalene-3,6,2',5'-tetrasulfonic acid.
152. 1-*amino*-7-phenylazo-8-hydroxynaphthalene-4,6,2',4'-tetrasulfonic acid.
153. 1-*amino*-7-(3',4'-dimethyl)-phenylazo-8-hydroxynaphthalene-4,6,6'-trisulfonic acid.
154. 1-*amino*-7-(4'-methyl)-phenylazo-8-hydroxynaphthalene-3,6-disulfonic acid.
155. 1-*amino*-7-phenylazo-8-hydroxynaphthalene-4,6,2'-trisulfonic acid.
156. 1-*amino*-7-napthyl-(2')-azo-8-hydroxynaphthalene-3,6,4',8'-tetrasulfonic acid.
157. 1-*amino*-7-naphthyl-(2')-azo-8-hydroxynaphthalene-3,6,5',7'-tetrasulfonic acid.
158. 1-*amino*-7-naphthyl-(2')-azo-8-hydroxynaphthalene-4,6,6',8'-tetrasulfonic acid.
159. 1-*amino*-7-naphthyl-(2')-azo-8-hydroxynaphthalene-3,6,5'(8')-trisulfonic acid.
160. 1-*amino*-7-naphthyl-(1')-azo-8-hydroxynaphthalene-4,6,3',6'-tetrasulfonic acid.
161. 1-*amino*-7-napthyl-(1')-azo-8-hydroxynaphthalene-3,6,4'-trisulfonic acid.
162. 1-*amino*-7-(4'-phenylazo)-phenylazo-8-hydroxynaphthalene-4,6,2',4''-tetrasulfonic acid.
163. 1-*amino*-7-(4'phenylazo)-phenylazo-8-hydroxynaphthalene-3,6,4''-trisulfonic acid.
164. 1-*amino*-7-[4'-(2''-methyl)-phenylazo-3'-methyl]-phenylazo-8-hydroxynaphthalene-3,6,4''-trisulfonic acid.
165. 1-*amino*-7-[4'-(4''-acetylamino)-phenyl]-phenylazo-8-hydroxynaphthalene-3,6,2'-trisulfonic acid.
166. 1-(3'-*amino*)-benzoylamino-7-phenylazo-8-hydroxynaphthalene-4,6,2''-trisulfonic acid.
167. 1-(3'-*amino*)-benzoylamino-7-phenylazo-8-hydroxynaphthalene-3,6,4''-trisulfonic acid.
168. 1-hydroxy-2-phenylazo-6-*amino*-naphthalene-3,3'-disulfonic acid.
169. 1-hydroxy-2-(4'-methyl)-phenylazo-6-*amino*-napthalene-3,2'-disulfonic acid.
170. 1-hydroxy-2-(4'-chloro)-phenylazo-6-*amino*-naphthalene-3,2'-disulfonic acid.
171. 1-hydroxy-2-(4'-methoxy)-phenylazo-6-*amino*-naphthalene-3,2'-disulfonic acid.
172. 1-hydroxy-2-(4',6'-dimethyl)-phenylazo-6-*amino*-naphthalene-3,2'-disulfonic acid.
173. 1-hydroxy-2-(4'-chloro-6'-methyl)-phenylazo-6-*amino*naphthalene-3,2'-disulfonic acid.
174. 1-hydroxy-2-(4'-acetylamino)-phenylazo-6-*amino*-naphthalene-3,2'-disulfonic acid.
175. 1-hydroxy-2(4'-phenylazo)-phenylazo-6-*amino*-naphthalene-3,2',4''-trisulfonic acid.
176. 1-hydroxy-2-phenylazo-6-*amino*naphthalene-3,2'-disulfonic acid.
177. 1-hydroxy-2-naphthyl-2'-azo-6-*amino*-naphthalene-3,4',8'-trisulfonic acid.
178. 1-hydroxy-2-naphthyl-2'-azo-6-*amino*-naphthalene-3,5',7'-trisulfonic acid.
179. 1-hydroxy-2-naphthyl-2'-azo-7-*amino*-naphthalene-3,3',6'-trisulfonic acid.
180. 1-hydroxy-2-naphthyl-2'-azo-6-*amino*-naphthalene-3,6',8'-trisulfonic acid.
181. 1-hydroxy-2-phenylazo-6-*amino*-naphthalene-3,2',4'-4'-trisulfonic acid.
182. 1-hydroxy-2-phenylazo-7-*amino*-naphthalene-3,2',5'-trisulfonic acid.
183. 1-hydroxy-2-naphthyl-(2')-azo-7-*amino*-naphthalene-3,1'-disulfonic acid.
184. 1-hydroxy-2-(2'-carboxy)-phenylazo-6-*amino*-naphthalene-3,4'-disulfonic acid.
185. 1-hydroxy-2-[4'-(6''-methyl)-benzothiazolyl-(2'')]-phenyl-azo-6-*amino*-naphthalene-3,2',x''-trisulfonic acid.
186. 1-hydroxy-2-(4'-phenylazo)-phenylazo-6-(4'''-*amino*-phenyl-amino)-naphthalene-3,2',4'',3'''-tetrasulfonic acid.
187. 1-hydroxy-2-(3',4'-dimethyl)-phenylazo-6-*amino*-naphthalene-3,6'-disulfonic acid.
188. 1-hydroxy-2-(2'-methoxy)-phenylazo-7-*amino*-naphthalene-3,5'-disulfonic acid.
189. 1-hydroxy-2-naphthyl-(2')-azo-7-*amino*-naphthalene-3,4',8'-trisulfonic acid.
190. 1-hydroxy-2-(3'-*amino*)-phenylazo-7-*amino*-naphthalene-3,6'-disulfonic acid.
191. 1-hydroxy-2-(2'-methyl-4'-chloro)-phenylazo-7-*amino*-naphthalene-3,6'-disulfonic acid.
192. 1-hydroxy-2-(4'-methyl)-phenylazo-7-*amino*-naphthalene-3,2'-disulfonic acid.
193. 1-hydroxy-2-(4',6'-dimethyl)-phenylazo-7-*amino*-naphthalene-3,2'-disulfonic acid.
194. 1-hydroxy-2-(4'-methoxy)-phenylazo-7-*amino*-naphthalene-3,2'-disulfonic acid.
195. 1-hydroxy-2-(4'-chloro)-phenylazo-7-*amino*-naphthalene-3,2'-disulfonic acid.
196. 1-hydroxy-2-[4'-(4''-acetylamino)-phenyl]-phenylazo-7-*amino*-naphthalene-3,2'-disulfonic acid.
197. 1-hydroxy-2-phenylazo-7-*amino*-naphthalene-3,4'-disulfonic acid.
198. 1-hydroxy-2-naphthyl-(2')-azo-7-*amino*-naphthalene-3,1',5'-trisulfonic acid.
199. 1-*amino*-7-[4'-(2''-methyl-4''-acetylamino)-phenyl-3'-methyl]-phenylazo-8-hydroxynaphthalene-3,6,5'-trisulfonic acid.
200. 1-*amino*-7-phenylazo-8-hydroxynaphthalene-3,6,4'-trisulfonic acid.
201. 1-*amino*-7-phenylazo-8-hydroxynaphthalene-3,6-disulfonic acid.
202. 1-*amino*-7-phenylazo-8-hydroxynaphthalene-4,6,4'-trisulfonic acid.
203. 1-*amino*-7-phenylazo-8-hydroxynaphthalene-4,6-disulfonic acid.
204. 1-*amino*-7-phenylazo-8-hydroxynaphthalene-4,6,3'-trisulfonic acid.
205. 1-*amino*-7-[4'-(4''-cyclohexyl)-phenoxy]-phenylazo-8-hydroxynaphthalene-3,6,2'-trisulfonic acid.
206. 1-*amino*-7-(2'-phenoxy)-phenylazo-8-hydroxynaphthalene-3,6,5'-trisulfonic acid.
207. 1-*amino*-7-(2'-methyl-4'-chloro)-phenylazo-8-hydroxynaphthalene-3,6,6'-trisulfonic acid.
208. 1-*amino*-7-(5',6',7',8'-tetrahydro)-naphthyl-2'-azo-8-hydroxynaphthalene-3,6,3'-trisulfonic acid.
209. 1-*amino*-7-(4'-chloro)-phenylazo-8-hydroxynaphthalene-4,6,2'-trisulfonic acid.
210. 1-*amino*-7-(4'-methyl)-phenylazo-8-hydroxynaphthalene-4,6,2'-trisulfonic acid.
211. 1-*amino*-7-(2',4'-dimethyl)-phenylazo-8-hydroxynaphthalene-4,6,6'-trisulfonic acid.
212. 1-*amino*-7-(2'-methyl-4'-chloro)-phenylazo-8-hydroxynaphthalene-4,6,6'-trisulfonic acid.
213. 1-*amino*-7-[4'-(4''-cyclohexyl)-phenoxy]-phenylazo-8-hydroxynaphthalene-4,6,2'-trisulfonic acid.
214. 1-hydroxy-2-naphthyl-(1')-azo-6-*amino*-naphthalene-3,4'-disulfonic acid.
215. 2-(4'-*amino*-2'-methyl)-phenylazo-naphthalene-3,6,8-trisulfonic acid.
216. 2-(4'-*amino*)-phenylazo-naphthalene-4,6,8-trisulfonic acid.
217. 2-(4'-*amino*-2'-methyl-5'-methoxy)-phenylazonaphthalene-4,8-disulfonic acid.

218. 2-(4'-*ethylamino*-2'-methyl)-phenylazonaphthalene-4,8-disulfonic acid.
219. 2-(4'-*methylamino*-2'-methoxy)-phenylazonaphthalene-4,8-disulfonic acid.
220. 2-(4'-*amino*-3'-methyl)-phenylazonaphthalene-4,8-disulfonic acid.
221. 2-(4'-*amino*-2'-methylsulfonylamino)-phenylazonaphthalene-4,8-disulfonic acid.
222. 2-(4'-*amino*-2',5'-dimethyl)-phenylazonaphthalene-4,8-disulfonic acid.
223. 2-[4'-(4''-*amino*-2''-methyl)-phenylazo-2'-methyl]-phenylazonaphthalene-4,8-disulfonic acid.
224. 2-[4'-(4''-*amino*-2''-methyl)-phenylazo-2'-methyl]-phenylazonaphthalene-4,6,8-trisulfonic acid.
225. 2-[4'-(4''-*amino*-2''-acetylamino)-phenylazo]-phenyl-6-methyl-benzothiazol-x,3'-disulfonic acid.
226. 1-(4'-*amino*-2'-methyl)-phenylazo-4-phenylazobenzol-2,4''-disulfonic acid.
227. 4'-*amino*-1,1'-azobenzol-2,4-disulfonic acid.
228. 4'-*amino*-2'-methyl-1,1'-azobenzol-2,5-disulfonic acid.
229. 2-(4'-*amino*-2'-methyl)-phenylazonaphthalene-3,6,8-trisulfonic acid.
230. 1-(4'-*amino*-2'-methyl)-phenylazonaphthalene-3,6,8-trisulfonic acid.
231. 1-(4'-*amino*-2'-methoxy-5'-methyl)-phenylazonaphthalene-4,8-disulfonic acid.
232. 1-(4'-*amino*)-phenylazo-naphthalene-3,6-disulfonic acid.
233. 1-(4'-*amino*-2'-methyl)-phenylazonaphthalene-3,8-disulfonic acid.
234. 2-(4'-*amino*-2',3'-tetramethylene)-phenylazonaphthalene-4,6,8-trisulfonic acid.
235. 2-(4'-*amino*)-naphthyl-(1')-azo-naphthalene-4,6,8-trisulfonic acid.
236. 2-(4'-*amino*-3'-methoxy)-naphthyl-(1')-azo-naphthalene-4,6,8-trisulfonic acid.
237. 2-(4'-*amino*)-naphthyl-(1')-azo-naphthalene-4,8,7'-trisulfonic acid.
238. 2-(4'-*amino*)-naphthyl-(1')-azo-naphthalene-5,7,6'-trisulfonic acid.
239. 2-(4'-*amino*-3'-ethoxy)-naphthyl-(1')-azo-naphthalene-4,6,8-trisulfonic acid.
240. 4'-*amino*-naphthyl-(1')-azo-benzene-2,5-disulfonic acid.
241. 4'-*amino*-3'-ethoxy-naphthyl-(1')-azobenzene-2,4-disulfonic acid.
242. 4'-*amino*-naphthyl-(1')-azo-benzene-4,7'-disulfonic acid.
243. 4'-*Amino*naphthyl-(1')-azo-benzene-3,6' - disulfonic acid.
244. 4'-*amino*naphthyl-(1')-azo - benzene - 2,4,7' - trisulfonic acid.
245. 2-[4'(4''-*amino*-2''-methyl)-phenylazo] - naphthyl-(1')-azo-naphthalene-4,6,8-trisulfonic acid.
246. 2-[4'-(4''-*amino*)-naphthyl-(1'')-azo]-naphthyl-(1') azo-naphthalene-4,6,8-trisulfonic acid.
247. 2 - [4' - (4''-*amino*)-naphthyl-(1'')-azo]-naphthyl-(1')-azo-naphthalene-3,6,8-tetrasulfonic acid.
248. 2-[4'-(4''-*amino*)-naphthyl-(1'')-azo]-naphthyl-(1')-azo-naphthalene-4.8.7',7''-tetrasulfonic acid.
249. 2-[4'-(4''-*amino*)-naphthyl-(1'')-azo]-phenylazo-naphthalene-3,6,2',6''-tetrasulfonic acid.
250. 1-[4''-*amino*)-naphthyl-(1'')-azo]naphthyl-(1')-azo-benzene-2,4,7'-trisulfonic acid.
251. 1-[4'-(4''-*amino*-2''-methyl)-phenylazo]-naphthyl-(1')-azo-benzene-2,4,7'-trisulfonic acid.
252. 1-[4'-(4''-*amino*)-naphthyl-(1'')-azo]-phenylazo-benzene-2',4-disulfonic acid.
253. 1-[4'-(4''-*amino*)-naphthyl-(1'')-azo]-azo-phenylazo-benzene-2',4,7'-trisulfonic acid
254. 1-[4'-(4''-*amino*)-naphthyl-(1'')-azo-2'-methyl]-phenylazo-naphthalene-4,6,8-trisulfonic acid.
255. 1-(4'-*amino*)-phenyl-3-methyl-4-phenylazo-5-pyrazolone-2'',4''-disulfonic acid.
256. 1-(4'-*amino*)-phenyl-3-methyl-4-naphthyl-(1''')-azo-5-pyrazolone-3'',6''-disulfonic acid.
257. 1-(3'-*amino*)-phenyl-3-methyl-4-phenylazo-5-pyrazolone-2'',5''-disulfonic acid.
258. 1-(3'-*amino*)-phenyl-3-carboxy-4-naphthyl-(2'')-azo-5-parazolone-4'',8''-disulfonic acid.
259. 1-(3'-*amino*)-phenyl-3-methyl-4-naphthyl-(2'')-azo-5-pyrazolone-4'',6'',8''-trisulfonic acid.
260. 1-[4'-(4''-*amino*-3''-ethoxy)-naphthyl-(1''')-azo]-naphthyl-(1''')-azo-naphthalene-3,8,7'-trisulfonic acid.
261. 1-hydroxy-2-[4'-(4''-*amino*-3''methyl)-phenyl-2'-methyl]-phenylazo-naphthalene-4,5'',6''-trisulfonic acid.
262. 4'-*amino*-4-(4''-phenylazo)-phenylazo-stilbene-2,2',4'''-trisulfonic acid.
263. 1-(2',3',6'-trichloro)-phenyl-3-methyl-4-(3''-*amino*)-phenylazo-5-pyrazolone-5',6''-disulfonic acid.
264. 1-(2'-chloro)-phenyl-3-methyl-4-[3''-(4'''-*amino*)-benzoylamino]-phenylazo-5-pyrazolone-4',6''-disulfonic acid.
265. 1-(2'-chloro-6'-methyl)-phenyl-3-methyl-4-(3''-*amino*)-phenylazo-5-pyrazolone-4',6''-disulfonic acid.
266. 1-(2'-chloro)-phenyl-3-methyl-4-(3''-*amino*)-phenylazo-5-pyrazolone-4',6''-disulfonic acid.
267. 1-(2',3'-tetramethylene)-phenyl-3-methyl-4-(3''-*amino*)-phenylazo-5-pyrazolone-4',6''-disulfonic acid.
268. 1,8-dihydroxy-2-(3'-*amino*)-phenylazonaphthalene-3,6,6'-trisulfonic acid.
269. 1-(3'-*amino*)-phenylazo-2-amino-8-hydroxynaphthalene-6,6'-disulfonic acid.
270. 1-(3'-*amino*)-phenylazo-2-amino-8-hydroxy-naphthalene-3,6,6'-trisulfonic acid.
271. 1-hydroxy-2-(3'-*amino*)-phenylazo-8-(2''-chloro)-benzoylamino-naphthalene-3,5,6'-trisulfonic acid.
272. 1-hydroxy-2-(3'-*amino*)-phenylazo-8-acetylamino-naphthalene-3,5,6'-trisulfonic acid.
273. 1-hydroxy-2-(4'-*amino*)-phenylazo-naphtalene-4,2'-disulfonic acid.
274. 1-hydroxy-2-(4'-*amino*)-phenylazonaphthalene-3,6,2'-trisulfonic acid.
275. 1-hydroxy-2-(4'-*amino*)-phenylazo-8-chloro-naphthalene-3,6,2'-trisulfonic acid.
276. 1-hydroxy-2-(4'-*amino*)-phenylazo-6-acetylaminonaphthalene-3,2'-disulfonic acid.
277. 1-hydroxy-2-(4'-*amino*)-phenylazo-7-acetylamino-naphthalene-3,2-disulfonic acid.
278. 1-(4'-*amino*)-phenylazo-2-amino-8-hydroxynaphthalene-6,2'-disulfonic acid.
279. 1-(4'-*amino*)-phenylazo-2-amino-8-hydroxynaphthalene-3,6,2'-trisulfonic acid.
280. 1,8-dihydroxy-2-(4'-*amino*)-phenylazo-naphthalene-3,6,2'-trisulfonic acid.
281. 1-hydroxy-2-(4'-*amino*)-phenylazo-8-acetylamino-naphthalene-3,6,2'-trisulfonic acid.
282. 1-hydroxy-2-(4'-*amino*)-phenylazo-8-(3'',4''-dichloro)-benzoyl-aminonaphthalene-3,6,2'-trisulfonic acid.
283. 1-[4'-(4''-*amino*)-phenyl]-phenylazo-2-amino-8-hydroxy-naphthalene-3,6,2'-trisulfonic acid.
284. 1-hydroxy-2-[4'-(4''-*amino*)-phenyl]-phenylazo-8-acetyl amino-naphthalene-3,6,2'-trisulfonic acid.
285. 1-hydroxy-2-[4'-(4''-*amino*)-phenylazo-8-benzoyl-amino-naphthalalene-3,6,2'-trisulfonic acid.
286. 1-hydroxy-2-[4'-(4''-*amino*)-phenyl]-phenylazo-8-acetyl-amino-naphthalene-3,5,2'-trisulfonic acid.
287. 1-hydroxy-2-[4'-(4''-*amino*)-phenyl]-phenylazo-8-(4'''-methyl)-benzoylaminonaphthalene-3,5,2'-trisulfonic acid.
288. 1-[(4''-*amino*)-stilbenyl-(4')]-3-methyl-4-phenylazo-5-pyrazolone-2',2'',2'''-trisulfonic acid.
289. 1-[(4''-*amino*-stilbenyl-(4')]-3-methyl-4-(2'''-carboxy)-phenylazo-5-pyrazolone-2',2'',4'''-trisulfonic acid.

290. 1-(3'-*amino*)-phenyl-3-methyl-4-phenylazo-5-pyrazolone-2",5"-disulfonic acid.
291. 1-(3'*amino*)-phenyl-3-carboxy-4-"-phenylazo)-phenylazo-5-pyrazolone-2",4"-disulfonic acid.
292. 1-(2'-chloro-4'-*amino*)-phenyl-3-methyl-4-phenylazo-5-pyrazolone-2",4"-disulfonic acid.
293. 1-[4'-(4"-*amino*)-phenyl]-phenyl-3-methyl-4-naphthyl-(2''')-azo-5-pyrazolone-4''', 8'''-disulfonic acid.
294. 1-hydroxy-2-phenylazo-8-(3"-*amino*)-benzoyl-amino-naphthalene-3,6,2'-trisulfonic acid.
295. 1-hydroxy-2-[4'-(4"-*amino*-2"-methyl)-phenyl-3' methyl]-phenylazonaphthalene-4,6'5"'-trisulfonic acid.
296. 1-hydroxy-2-(3'-*amino*)-phenylazo-8-ethoxy-naphthalene-3,6,6' trisulfonic acid.
297. 1-hydroxy-2-[4'-(4"-*amino*-2"-methyl)-phenyl-3'-methyl]-phenylazo-8-ethoxy-naphthalene-3,6,6'-trisulfonic acid.
298. 1-hydroxy-2-[4'-(4"-*amino*-2"-methyl)-phenyl-3'-methyl]-phenylazo-8-naphthalene-3,6,6'-trisulfonic acid.
299. 1-hydroxy-2-(4'-*amino*)-phenylazo-8-ethoxy-naphthalene-3,6,2'-trisulfonic cadi.
300. 1-hydroxy-2-(3'-*amino*)-phenylazo-8-(3"-amino)-benzoylamino-naphthalene-3,6,6'-trisulfonic acid.
301. 1-hydroxy-2-(3'-*amino*)-phenylazo-8-(4"-amino)-benzoylamino- naphthalene-3,6,6'-trisulfonic acid.
302. 1-hydroxy-2-(3'-*amino*)-phenylazo-8-[4",6"-dihydroxy-1",3",5"- triazinyl-(2")]-amino-naphthalene-3,6,6'-trisulfonic acid.
303. 1-hydroxy-2-(3'-*amino*)-phenylazo-8-[4",6"-di-amino-1",3",5"-triazinyl-(2")]-amino-naphthalene-3,6,6'-trisulfonic acid.
304. 1-hydroxy-2-(3'-*amino*)-phenylazo-8-[4",6"-bis-(4'''-sulfophenyl)-1''',3",5"-triazinyl-(2")]-amino-naphthalene-3,6,6'-trisulfonic acid.
305. 1-hydroxy-2-(3-*amino*)-phenylazo-8-(3'-*amino*)-benzoylamino-naphthalene-3,6,6'-trisulfonic acid.
306. 1-hydroxy-2-(3'-*amino*)-phenylazo-7-(3"-*amino*)-phenylazo-8-amino-naphthalene-3,6,6',6"-tetrasulfonic acid.
307. 1-hydroxy-2-(4'-*amino*)-phenylazo-7-(4"-*amino*)-phenylazo-8-amino-naphthalene-3,6,2',2"-tetrasulfonic acid.
308. 1-hydroxy-2-(3'-*amino*)-phenylazo-8-(4"-*amino*)-benzoylamino-naphthalene-3,6,6'-trisulfonic acid.
309. 1-[4'-(4"-*amino*)-phenyl]-phenylazo-2-hydroxy-naphthalene-3,6,8,2'-tetrasulfonic acid.
310. 1:2-chromium complex compound of 1-hydroxy-2-(2'-hydroxy-5'-nitro)-phenylazo-8-*amino*naphthalene-3,6-disulfonic acid.
311. 1:2-chromium complex compound of 1-hydroxy-2-(2'-hydroxy-5'-chloro)-phenylazo-8-*amino*naphthalene-3,6-disulfonic acid.
312. 1:2-chromium complex compound of 1-hydroxy-2-(2'-hydroxy-4'-nitro-5'-chloro)-phenylazo-8-*amino*-naphthalene-3,6-disulfonic acid.
313. 1:2-chromium complex compound of 1-hydroxy-2-(2'-hydroxy-3'-chloro-5'-nitro)-phenylazo-8-*amino*-naphthalene-3,6-disulfonic acid.
314. 1:2-chromium complex compound of 1-hydroxy-2-(2'-hydroxy-3'-nitro-5'-chloro)-phenylazo-8-*amino*-naphthalene-3,6-disulfonic acid.
315. 1:2-chromium complex compound of 1-hydroxy-2-(2'-hydroxy-3',5'-dinitro)-phenylazo-8-*amino*naphthalene-3,6-disulfonic acid.
316. 1:2-cobalt complex compound of 1-hydroxy-2-(2'-hydroxy-5'-chloro)-phenylazo-8-*amino*naphthalene-3,6-disulfonic acid.
317. 1:2-cobalt complex compound of 1-hydroxy-2-(2'-hydroxy-4'-nitro-5'-chloro)-phenylazo-8-*amino*naphthalene-3,6-disulfonic acid.
318. 1:2-cobalt complex compound of 1-hydroxy-2-(2'-hydroxy-3'-chloro-5'-nitro)-phenylazo-8-*amino*naphthalene-3,6-disulfonic acid.
319. 1:2-cobalt complex compound of 1-hydroxy-2-(2'-hydroxy-3'-nitro-5'-chloro)-phenylazo-8-*amino*naphthalene-3,6-disulfonic acid.
320. 1:2-cobalt complex compound of 1-hydroxy-2-(2'-hydroxy-3',5'-dinitro)-phenylazo-8-*amino*naphthalene-3,6-disulfonic acid.
321. 1:2-chromium complex compound of 1-hydroxy-2-(2'-hydroxy-5'-nitro)-phenylazo-8-*amino*naphthalene-3,5-disulfonic acid.
322. 1:2-chromium complex compound of 1-hydroxy-2-(2'-hydroxy-5'-chloro)-phenylazo-8-*amino*naphthalene-3,5-disulfonic acid.
323. 1:2-chromium complex compound of 1-hydroxy-2-(2'-hydroxy-5'-nitro)-phenylazo-7-*amino*naphthalene-3,6-disulfonic acid.
324. 1:2-chromium complex compound of 1-hydroxy-2-(2'-hydroxy-5'-chloro)-phenylazo-7-*amino*naphthalene-3,6-disulfonic acid.
325. 1:2-chromium complex compound of 1-hydroxy-2-(2'-hydroxy-5'-chloro)-phenylazo-8-*amino*naphthalene-5,7-disulfonic acid.
326. 1:2-cobalt complex compound of 1-hydroxy-2-(2'-hydroxy-5'-nitro)-phenylazo-8-*amino*naphthalene-3,5-disulfonic acid.
327. 1:2-cobalt complex compound of 1-hydroxy-2-(2'-hydroxy-5'-chloro)-phenylazo-8-*amino*naphthalene-3,5-disulfonic acid.
328. 1:2-cobalt-complex compound of 1-hydroxy-2-(2'-hydroxy-5'-nitro)-phenylazo-7-*amino*naphthalene-3,6-disulfonic acid.
329. 1:2-cobalt complex compound of 1-hydroxy-2-(2'-hydroxy-5'-chloro)-phenylazo-7-*amino*naphthalene-3,6-disulfonic acid.
330. 1:2-cobalt complex compound of 1-hydroxy-2-(2'-hydroxy-5'-chloro)-phenylazo-8-*amino*naphthalene-5,7-disulfonic acid.
331. 1:2-cobalt complex compound of 1-hydroxy-2-(2'-hydroxy-5'-*amino*)-phenylazo-4-nitrobenzene-6-sulfonic acid.
332. 1:2-cobalt complex compound of 1-hydroxy-2-(2'-hydroxy-5'-*amino*)-phenylazo-6-nitrobenzene-4-sulfonic acid.
333. 1:2-cobalt complex compound of 1-hydroxy-2-(2'-hydroxy-5'-*amino*)-phenylazo-6-chlorobenzene-4-sulfonic acid.
334. 1:2-cobalt complex compound of 1-hydroxy-2-(2'-hydroxy-5'-*amino*)-phenylazo-4-chlorobenzene-6-sulfonic acid.
335. 1:2-cobalt complex compound of 1-hydroxy-2-(2'-hydroxy-4'-*amino*-5'-methyl)-phenylazo-6-chlorobenzene-6-sulfonic acid.
336. 1:2-chromium complex compound of 1-hydroxy-2-(2'-hydroxy-5'-*amino*)-phenylazo-4-chlorobenzene-6-sulfonic acid.
337. 1:2-chromium complex compound of 1-hydroxy-2-(2'-hydroxy-5'-*amino*)-phenylazo-4-nitrobenzene-4-sulfonic acid.
338. 1:2-chromium complex compound of 1-hydroxy-2-(2'-hydroxy-5'-*amino*)-phenylazo-6-chlorobenzene-4-sulfonic acid.
339. 1:2-chromium complex compound of 1-hydroxy-2-(2'-hydroxy-5'-*amino*)-phenylazo-4-chlorobenzene-6-sulfonic acid.
340. 1:2-chromium complex compound of 1-hydroxy-2-(2'-hydroxy-4'-*amino*-5'-methyl)-phenylazo-6-chlorobenzene-6-sulfonic acid.
341. 1:2-chromium complex compound of 1-hydroxy-2-(2'-hydroxy-4'-*amino*-5'-methyl)-phenylazo-6-nitrobenzene-4-sulfonic acid.
342. 1:2-chromium complex compound of 1-hydroxy-2-(2'-hydroxy-4'-*amino*-5'-methyl)-phenylazo-4-nitrobenzene-6-sulfonic acid.
343. 1:2-chromium complex compound of 1-hydroxy-2-(2'-hydroxy-4'-*amino*-5'-methyl)-phenylazo-4-chlorobenzene-6-sulfonic acid.

344. 1:2-chromium complex compound of 1-hydroxy-2-(2'-hydroxy-3'-*amino*-5'-methyl)-phenylazo-4-nitrobenzene-6-sulfonic acid.
345. 1:2-chromium complex compound of 1-hydroxy-2-(2'-hydroxy-3'-*amino*-5'-methyl)-phenylazo-6-chlorobenzene-4-sulfonic acid.
346. 1:2-cobalt complex compound of 1-hydroxy-2-(2'-hydroxy-4'-*amino*-5'-methyl)-phenylazo-6-nitrobenzene-4-sulfonic acid.
347. 1:2-cobalt complex compound of 1-hydroxy-2-(2'-hydroxy-4'-*amino*-5'-methyl-phenylazo-4-nitrobenzene-6-sulfonic acid.
348. 1:2-cobalt complex compound of 1-hydroxy-2-(2'-hydroxy-4'-*amino*-5'-methyl)-phenylazo-4-chlorobenzene-6-sulfonic acid.
349. 1:2-cobalt complex compound of 1-hydroxy-2-(2'-hydroxy-3'-*amino*-5'-methyl)-phenylazo-4-nitrobenzene-6-sulfonic acid.
350. 1:2-cobalt complex compound of 1-hydroxy-2-(2'-hydroxy-3'-*amino*-5'-methyl)-phenylazo-6-chlorobenzene-4-sulfonic acid.
351. Copper complex compound of 1-hydroxy-2-(1'-hydroxy)-naphthyl-(2')-azo-8-*amino*naphthalene-3,6,4',8'-tetrasulfonic acid.
352. Copper complex compound of 1-hydroxy-2-(1'-hydroxy)-naphthyl-(2')-azo-8-*amino*naphthalene-3,6,6',8'-tetrasulfonic acid.
353. Copper complex compound of 1-hydroxy-2-(1'-hydroxy)-naphthyl-(2')-azo-8-*amino*naphthalene-3,6,5',7'-tetrasulfonic acid.
354. Copper complex compound of 1-hydroxy-2-(1'-hydroxy)-naphthyl-(2')-azo-8-*amino*naphthalene-3,6,6'-trisulfonic acid.
355. Copper complex compound of 1-hydroxy-2-(1'-hydroxy)-naphthyl-(2')-azo-8-*amino*naphthalene-3,6,8'-trisulfonic acid.
356. Copper complex compound of 1-hydroxy-2-(1'-hydroxy)-naphthyl-(2')-azo-8-*amino*naphthalene-3,6,4'-trisulfonic acid.
357. Copper complex compound of 1-hydroxy-2-(1'-hydroxy)-naphthyl-(2')-azo-8-*amino*naphthalene-5,4',8'-trisulfonic acid.
358. Copper complex compound of 1-hydroxy-2-(1'-hydroxy)-naphthyl-(2')-azo-8-*amino*naphthalene-3,5,4',8'-tetrasulfonic acid.
359. Copper complex compound of 1-hydroxy-2-(1'-hydroxy)-naphthyl-(2')-azo-8-*amino*naphthalene-3,6,5'-trisulfonic acid.
360. Copper complex compound of 1-phenyl-3-methyl-4-(2''-hydroxy-6''-*amino*)-naphthyl-(1')-azo-5-pyrazolone-2',4',4''-trisulfonic acid.
361. 1:2-cobalt complex compound of 1-phenyl-3-methyl-4-(2''-hydroxy-3''-amino)-phenylazo-5-pyrazolone-4',5''-disulfonic acid.
362. 1:2-cobalt complex compound of 1-(2',5-dichloro)-phenyl-3-methyl-4-(2''-hydroxy-3''-*amino*)phenylazo-5-pyrazolone-4',5''-tri-sulfonic acid.
363. 1:2-cobalt complex compound of 1-(3'-*amino*)-phenyl-3-methyl-4-(2''-hydroxy-5''-chloro)-phenylazo-5-pyrazolone-3''-sulfonic acid.
364. 1:2-cobalt complex compound of 1-(3'-*amino*)-phenyl-3-methyl-4-(2''-hydroxy-3''chloro)-phenylazo-5-pyrazolone-5''-sulfonic acid.
365. 1:2-cobalt complex compound of 1-phenyl-3-methyl-4-(2''-hydroxy-3''-*amino*-5'-nitro)-phenylazo-5-pyrazolone-2',5''-disulfonic acid.
366. 1:2-cobalt complex compound of 1-(3'-*amino*)-phenyl-3-methyl-4-(2''-hydroxy-5''-nitro)-phenylazo-5-pyrazolone-3''-sulfonic acid.
367. 1:2-cobalt complex compound of 1-(3'-*amino*)-phenyl-3-methyl-4-(2''hydroxy-3''-nitro)-phenylazo-5-prazolone-5''-sulfonic acid.
368. 1:2-cobalt complex compound of 1-(4'-*amino*)-phenyl-3-methyl-4-(2''-hydroxy-5''-nitro)-phenylazo-5-pyrazolone-3''-sulfonic acid.
369. 1:2-cobalt complex compound of 1-(4'-*amino*)-phenyl-3-methyl-4-(2''-hydroxy-3''-nitro)-phenylazo-5-pyrazolone-5''-sulfonic acid.
370. 1:2-colbalt complex compound of 1-(2',5'-dichloro)-phenyl-3-methyl-4-(2''-hydroxy-6''-*amino*)-naphthyl-(1'')-azo-5-pyrazolone-4',4''-disulfonic acid.
371. 1:2-cobalt complex compound of 1-(2',5'-dichloro)-phenyl-3-methyl-4-(2''-hydroxy-4''-*amino*-5''-methyl)-phenylazo-5-pyrazolone-4'-sufonic acid.
372. 1:2-chromium complex compound of 1-phenyl-3-methyl-4-(2''-hydroxy-3''-*amino*)-phenylazo-5-pyrazolone-4',5''-disulfonic acid.
373. 1:2-chromium complex compound of 1-(2',5-dichloro)-phenyl-3-methyl-4-(2''-hydroxy-3''-*amino*)-phenylazo-5-pyrazolone-4',5''-trisulfonic acid.
374. 1:2-chromium complex compound of 1-(3'-*amino*)-phenyl-3-methyl-4-(2''-hydroxy-5''-chloro)-phenylazo-5-pyrazolone-3''-sulfonic acid.
375. 1:2-chromium complex compound of 1-(3'-*amino*)-phenyl-3-methyl-4-(2''-hydroxy-3''-chloro)-phenylazo-5-pyrazolone-5''-sulfonic acid.
376. 1:2-chromium complex compound of 1-phenyl-3-methyl-4-(2''-hydroxy-3''-*amino*-5'-nitro)-phenylazo-5-pyrazolone-2',5''-disulfonic acid.
377. 1:2-chromium complex compound of 1-(3'-*amino*)-phenyl-3-methyl-4-(2''-hydroxy-5''-nitro)-phenylazo-5-pyrazolone-3''-sulfonic acid.
378. 1:2-chromium complex compound of 1-(3'-*amino*)-phenyl-3-methyl-4-(2''-hydroxy-3''-nitro)-phenylazo-5-pyrazolone-5''-sulfonic acid.
379. 1:2-chromium complex compound of 1-(4'-*amino*)-phenyl-3-methyl-4-(2''-hydroxy-5''-nitro)-phenylazo-5-pyrazolone-3''-sulfonic acid.
380. 1:2-chromium complex compound of 1-(4'-*amino*)-phenyl-3-methyl-4-(2''-hydroxy-3''-nitro)-phenylazo-5-pyrazolone-5''-sulfonic acid.
381. 1:2-chromium complex compound of 1-(2',5'dichloro)-phenyl-3-methyl-4-(2''-hydroxy-4''-*amino*-5''-methyl)-phenylazo-5-pyrazolone-4'-sulfonic acid.
382. 1-hydroxy-2-(4'-methoxy)-phenylazo-1-*methyl-amino*-naphthalene-3,2'-disulfonic acid.
383. 1-hydroxy-2-phenylazo-6-*ethylamino*-naphthalene-3,2',5'-trisulfonic acid.
384. 1-amino-4-(4'-*amino*)-phenylaminoanthraquinone-2,7,3'-trifulsonic acid.
385. 1-amino-4-(4'-*amino*)-phenylaminoanthraquinone-2,6-disulfonic acid.
386. 1-amino-4-(3'-*amino*)-phenylaminoanthraquinone-2,7-disulfonic acid.
387. 1-amino-4-[4'-(4''-*amino*)-phenyl]-phenylaminoanthraquinone-2.6-disulfonic acid.
388. 1-amino-4-[4'-(4''-*amino*-2''-methyl)-phenyl-3'-methyl]-phenylaminoanthraquinone-2.7-disulfonic acid.
389. 1-amino-4-(3'-*amino*)-phenylamino-anthraquinone-2,5,4'-trisulfonic acid.
390. 1-amino-4-(4'-*ethylamino*)-phenylamino-anthraquinone-2,8,2',trisulfonic acid.
391. 1-amino-4-(3'-*amino*)-phenylamino-anthraquinone-2,4',6'-trifulsonic acid.
392. 1-amino-2-phenoxy-4-(4''-*amino*)-phenylamino-anthraquinone-2'-4',2''-trisulfonic acid.
393. 1-amino-2-(4'-methyl)-phenoxy-4-(4''-*methylamino*)-phenylamino-anthraquinone-2',2''-disulfonic acid.
394. 1-amino-2-(4'-iso-octyl)-phenoxy-4-(3''-*amino*)-phenylamino-anthraquinone-2',4'',6''-trisulfonic acid.
395. 1-amino-2-(4'-tert.butyl)-phenoxy-4-(3''-*amino*)-phenylamino-anthraquinone-2',4''-disulfonic acid.
396. 1-amino-2-(4'-ethyl)-phenoxy-4-(3''-*amino*)-phenylamino-anthraquinone-2',4''-disulfonic acid.
397. 1-amino-2-(4'-methyl)-phenoxy-4-(3''-*amino*)-phenylamino-anthraquinone-2',4''-disulfonic acid.
398. 1-amino-2-(4'-methyl-phenoxy-4-(4''-*amino*)-phenylamino-anthraquinone-2',3''-disulfonic acid.

399. 1-amino-2-(4'-tert.amyl)-phenoxy-4-(3''-*amino*)-phenylamino-anthraquinone-2'-4''-disulfonic acid.
400. 1-amino-2-(4'-tert.butyl)-phenoxy-4-(4''-*ethylamino*)-phenylaminoanthraquinone-2',3''-disulfonic acid.
401. 1-amino-2-phenoxy-4-[4''-(4'''-*amino*)-phenyl]-phenylamino-2',4',3'''-trisulfonic acid.
402. 1-amino-2-phenoxy-4-[4''-(4'''-*amino*-2'''-methyl)-phenyl-3''-methyl]-phenylaminoanthraquinone-2',4',5'''-trisulfonic acid.
403. 1-phenyl-3-methyl-4-[4''-(4'''-*amino*-2'''-methyl)-phenyl-3''-methyl]-phenylazo-5-pyrazolone-2',5'6''-trisulfonic acid.
404. 4-amino-4'-(4'-methoxy)-phenylazo-stilbene-2,2'-disulfonic acid.
405. 1-(4'-*amino*-2'-sulfacetylamino)-phenylazo-benzene-4-sulfonic acid.
406. 1-naphthyl-(2')-3-methyl-4-[4''-(4'''-*amino*)-phenyl]-phenyl-azo-5-pyrazolone-4',8',2''-trisulfonic acid.
407. 1-phenyl-3-methyl-4-[4''-(3'''-*amino*)-phenyl-azo-3''-methyl]-phenylazo-5-pyrazolone-2',4',6'''-trisulfonic acid.
408. 1-phenyl-3-methyl-4-[4''-(4'''-*amino*)-phenylazo-2''-methoxy-5''-methyl]-phenylazo-5-pyrazolone-2',5',2'''-trisulfonic acid.
409. 1-naphthyl-(2')-3-methyl-4-[4''-(4'''-*amino*)-phenylazo-3''-methyl]-phenylazo-5-pyrazolone-4',8',2'''-trisulfonic acid.
410. 1-naphthyl-(2')-3-methyl-4-[4''-(4'''-*amino*)-phenylazo-3''-methyl]-phenylazo-5-pyrazolone-5',7',2'''-trisulfonic acid.
411. 1-(4''-*amino*)-stilbenyl-(4')-3-methyl-4-(4'''-phenylazo)-phenylazo-5-pyrazolone-2',2'',2''',4'''''-tetrasulfonic acid.
412. 1-hydroxy-2-(4'-phenylazo)-7-*amino*-naphthalene-3,2',4''-trisulfonic acid.
413. 1-(4'-*amino*-2'-methylsulfonylamino)-phenylazo-3-methyl-4-phenylazobenzene-2'',4''disulfonic acid.
414. 1-(4'-*amino*-2'-sulfoacetylamino)-phenylazo-3-methyl-4-phenylazobenzene-2'',4''-disulfonic acid.
415. 2-[4'-(4''-*amino*)-naphthyl-(1'')-azo]-phenylazonaphthalene-4,6,8,7''-tetrasulfonic acid.
416. 2-[4'-(4''-*amino*-3''-ethoxy)-naphthyl-(1'')-azo]-phenylazonaphthalene-4,8,3'-trisulfonic acid.
417. 2-[4'-(1'''-hydroxyl-6'''-*amino*)-naphthyl-(2'')-azo-2'-methyl]-phenylazonaphthalene-6,8,3'-trisulfonic acid.
418. 1-[4'-(1''-hydroxy-6''-*amino*)-naphthyl-(2'')-azo]-naphthyl-(1')-azobenzene-4,7',3''-trisulfonic acid.
419. 1-[4'-(4''-*amino*)-naphthyl-(1'')-azo-3'-ethoxy]-naphthyl-(1')-azo-benzene-2,4,6''-trisulfonic acid.
420. 4-(4''-*amino*-2''-methyl)-phenylazo-4'-(1'''-hydroxy)-naphthyl-(2''')-azo-3,3'-diamethyl-1,1'diphenyl-6,6'4'''-trisulfonic acid.
421. 4-(4''-*amino*-3''-methoxy-6''-methyl)-phenylazo-4'-(1'''-hydroxy)-naphthyl-(2''')-azo-1,1'-diphenyl-2,2',4''',6'''-tetrasulfonic acid.
422. 4-(4''-acetylamino)-phenylazo-4'-(1'''-hydroxy-6'''-*amnio*)-naphthayl-(2''')-azo-1,1'-diphenyl-2,2',3'''-trisulfonic acid.
423. 4-(4''-*amino*-2''-methyl)-phenylazo-4'-(1'''-hydroxy)-naphthyl-(2''')-azo-2,2'-dimethyl-1,1'-diphenyl-5',3''',6'''-trisulfonic acid.
424. 4-(4''-*amino*-2''-sulfoacetylamino)-phenylazo-4'-(1'''-hydroxy)-naphthyl-(2''')-azo-2,2'-dimethyl-1,1'-diphenyl-5',4'''-disulfonic acid.
425. 4-(4''-*amino*-2''-methyl)-phenylazo-4'-(2'''-hydroxy)-naphthayl-(1''')-azo-3,3'-dimethyl-1,1'-diphenyl-6,6',3''',6'''-tetrasulfonic acid.
426. 4-(4''-*amino*-2''-methyl)-phenylazo-4'-(1'''-hydroxy-8-*amino*)-naphthayl-(2''')-azo-2,2'-dimethyl-1,1'-diphenyl-5,3''',6'''-trisulfonic acid.
427. 4-(4''-*amino*-2''-acetylamino)-phenylazo-4'-(2'''-hydroxy)-naphthyl-(1''')-azo-1,1'-diphenyl-5,3'''-tetrasulfonic acid.
428. Copperphthalocyanine trisulfonic acid-sulfonic acid-(3'-*amino*-4'-suflo)-phenylamide.
429. Copperphthalocyanine-sulfonic acid-disulfonic acid amide-sulfonic acid-(3'-*amino*-4'-sulfo)-phenylamide.
430. Copperphthalocyanine-sulfonic acid-disulfonic acid amide-sulfonic acid-(4'-*amino*-3'-sulfo)-phenylamide.

The reactive components employed in the foregoing examples are:

2,4-dibromo-5-bromomethylpyrimidine in Examples 12, 29, 38, 93, 116, 136, 153, 176 and 235.

2,4-dichloro-5-chloromethylpyrimidine in Examples 17 to 19, 28, 39, 54, 69, 70, 106, 139, 146, 154 to 156, 236, 248, 258, 272, 273, 290, 313, 332, 352, 380, 393, 412 and 423.

2,4-dibromo-5-bromomethyl-6-methylpyrimidine in Examples 40, 80, 97, 107, 117, 152, 200, 229, 259, 309, 314, 333, 361, 391, 392, 415 and 427.

2,4-dichloro-5-chloromethyl-6-methylpyrimidine in Examples 13 to 16, 20 to 27, 30 to 37, 41 to 53, 54 to 68, 71 to 79, 81 to 92, 94 to 96, 98 to 105, 108 to 115, 118 to 135, 137, 138, 140 to 145, 147 to 151, 157 to 175, 177 to 199, 201 to 228, 230 to 234, 237 to 247, 249 to 257, 260 to 271, 274 to 289, 291 to 308, 310 to 312, 315 to 331, 334 to 351, 353 to 360, 362 to 379, 381 to 390, 394 to 411, 413, 414, 416 to 422, 424 to 426 and 428 to 430.

The copperphthalocyanine dyestuffs Nos. 18, 95, 96, 428 and 430 are derived from copperphthalocyanine-3,3',3'',3'''-tetrasulfonic acid chloride; the copperphthalocyanine dyestuffs Nos. 93, 94, 97 and 429 are derived from copperphthalocyanine-4,4',4'',4'''-tetrasulfonic acid chloride.

The dyeings on cotton obtained with the reactive dyestuffs derived from the dyestuffs No. 12 to 430 have the following shades:

| Dyestuff No.: | Shade |
|---|---|
| 12 | Blue. |
| 13 | Blue. |
| 14 | Blue. |
| 15 | Blue-red. |
| 16 | Scarlet. |
| 17 | Blue-green. |
| 18 | Turquoise-blue. |
| 19 | Blue-red. |
| 20 | Do. |
| 21 | Do. |
| 22 | Do. |
| 23 | Do. |
| 24 | Violet. |
| 25 | Blue-red. |
| 26 | Blue-violet. |
| 27 | Orange-yellow. |
| 28 | Orange. |
| 29 | Do. |
| 30 | Do. |
| 31 | Do. |
| 32 | Yellow. |
| 33 | Orange-yellow. |
| 34 | Orange. |
| 35 | Orange. |
| 36 | Orange. |
| 37 | Golden-orange. |
| 38 | Orange-yellow. |
| 39 | Do. |
| 40 | Do. |
| 41 | Orange. |
| 42 | Orange-red. |
| 43 | Do. |
| 44 | Do. |
| 45 | Do. |
| 46 | Scarlet. |

| Dyestuff No.: | Shade |
|---|---|
| 47 | Orange-red. |
| 48 | Scarlet. |
| 49 | Red. |
| 50 | Blue-red. |
| 51 | Red. |
| 52 | Blue-red. |
| 53 | Do. |
| 54 | Orange-red. |
| 55 | Red. |
| 56 | Red. |
| 57 | Red. |
| 58 | Blue-red. |
| 59 | Do. |
| 60 | Do. |
| 61 | Do. |
| 62 | Violet. |
| 63 | Do. |
| 64 | Blue-red. |
| 65 | Do. |
| 66 | Do. |
| 67 | Red. |
| 68 | Blue-red. |
| 69 | Do. |
| 70 | Do. |
| 71 | Do. |
| 72 | Brown. |
| 73 | Orange. |
| 74 | Orange-yellow. |
| 75 | Greenish-black. |
| 76 | Orange. |
| 77 | Blue-red. |
| 78 | Violet. |
| 79 | Blue. |
| 80 | Violet-blue. |
| 81 | Blue-violet. |
| 82 | Red-brown. |
| 83 | Navy-blue. |
| 84 | Gray. |
| 85 | Brown. |
| 86 | Navy-blue. |
| 87 | Reddish-blue. |
| 88 | Do. |
| 89 | Do. |
| 90 | Blue. |
| 91 | Blue. |
| 92 | Reddish blue. |
| 93 | Turquoise blue. |
| 94 | Do. |
| 95 | Do. |
| 96 | Do. |
| 97 | Do. |
| 98 | Navy-blue. |
| 99 | Navy-blue. |
| 100 | Brown-violet. |
| 101 | Gray. |
| 102 | Brown-violet. |
| 103 | Greenish gray. |
| 104 | Gray. |
| 105 | Navy-blue. |
| 106 | Violettish-brown. |
| 107 | Navy-blue. |
| 108 | Brown-violet. |
| 109 | Gray. |
| 110 | Navy-blue. |
| 111 | Brown-violet. |
| 112 | Navy-blue. |
| 113 | Navy-blue. |
| 114 | Navy-blue. |
| 115 | Red. |
| 116 | Red. |
| 117 | Scarlet. |
| 118 | Blue-red. |
| 119 | Blue-violet. |
| 120 | Violet. |
| 121 | Blue-violet. |
| 122 | Blue-violet. |
| 123 | Violet. |
| 124 | Blue-violet. |
| 125 | Violet. |
| 126 | Violet. |
| 127 | Blue-violet. |
| 128 | Do. |
| 129 | Violet. |
| 130 | Do. |
| 131 | Blue. |
| 132 | Reddish blue. |
| 133 | Bluish red. |
| 134 | Orange. |
| 135 | Yellow. |
| 136 | Blue-red. |
| 137 | Blue-violet. |
| 138 | Yellow. |
| 139 | Do. |
| 140 | Blue-red. |
| 141 | Red. |
| 142 | Blue. |
| 143 | Orange. |
| 144 | Blue-red. |
| 145 | Do. |
| 146 | Blue. |
| 147 | Violet. |
| 148 | Blue-red. |
| 149 | Do. |
| 150 | Violet. |
| 151 | Blue-red. |
| 152 | Do. |
| 153 | Violet. |
| 154 | Violet. |
| 155 | Blue-red. |
| 156 | Blue-violet. |
| 157 | Do. |
| 158 | Do. |
| 159 | Do. |
| 160 | Reddish blue. |
| 161 | Do. |
| 162 | Blue. |
| 163 | Do. |
| 164 | Do. |
| 165 | Do. |
| 166 | Blue-red. |
| 167 | Violet. |
| 168 | Orange-red. |
| 169 | Scarlet. |
| 170 | Orange-red. |
| 171 | Scarlet. |
| 172 | Orange-red. |
| 173 | Do. |
| 174 | Red. |
| 175 | Blue-red. |
| 176 | Orange-red. |
| 177 | Red. |
| 178 | Red. |
| 179 | Bluish red. |
| 180 | Red. |
| 181 | Scarlet. |
| 182 | Red. |
| 183 | Blue-red. |
| 184 | Orange-red. |
| 185 | Red. |
| 186 | Blue-violet. |
| 187 | Scarlet. |
| 188 | Blue-red. |
| 189 | Blue-red. |
| 190 | Scarlet. |
| 191 | Red. |

| Dyestuff No.: | Shade |
|---|---|
| 192 | Red. |
| 193 | Red. |
| 194 | Blue-red. |
| 195 | Red. |
| 196 | Blue-violet. |
| 197 | Bluish red. |
| 198 | Blue-red. |
| 199 | Violet. |
| 200 | Blue-red. |
| 201 | Do. |
| 202 | Do. |
| 203 | Blue-red. |
| 204 | Do. |
| 205 | Violet. |
| 206 | Violet. |
| 207 | Blue-red. |
| 208 | Violet. |
| 209 | Blue-red. |
| 210 | Do. |
| 211 | Blue-red. |
| 212 | Blue-red. |
| 213 | Blue-red. |
| 214 | Bluish-red. |
| 215 | Orange. |
| 216 | Do. |
| 217 | Do. |
| 218 | Do. |
| 219 | Do. |
| 220 | Do. |
| 221 | Do. |
| 222 | Do. |
| 223 | Orange-brown. |
| 224 | Do. |
| 225 | Orange. |
| 226 | Orange-brown. |
| 227 | Yellow-orange. |
| 228 | Do. |
| 229 | Orange. |
| 230 | Orange-brown. |
| 231 | Do. |
| 232 | Orange-brown. |
| 233 | Do. |
| 234 | Do. |
| 235 | Do. |
| 236 | Do. |
| 237 | Do. |
| 238 | Do. |
| 239 | Do. |
| 240 | Brown-orange. |
| 241 | Do. |
| 242 | Do. |
| 243 | Do. |
| 244 | Do. |
| 245 | Red-brown. |
| 246 | Do. |
| 247 | Do. |
| 248 | Red-brown. |
| 249 | Orange-brown. |
| 250 | Red-brown. |
| 251 | Orange-brown. |
| 252 | Do. |
| 253 | Do. |
| 254 | Do. |
| 255 | Do. |
| 256 | Orange. |
| 257 | Orange-yellow. |
| 258 | Orange. |
| 259 | Orange. |
| 260 | Red-brown. |
| 261 | Red. |
| 262 | Orange. |
| 263 | Yellow. |
| 264 | Orange. |
| 265 | Yellow. |
| 266 | Yellow. |
| 267 | Orange. |
| 268 | Blue-red. |
| 269 | Do. |
| 270 | Do. |
| 271 | Do. |
| 272 | Do. |
| 273 | Do. |
| 274 | Do. |
| 275 | Do. |
| 276 | Red. |
| 277 | Blue-red. |
| 278 | Do. |
| 279 | Do. |
| 280 | Blue-violet. |
| 281 | Violet. |
| 282 | Do. |
| 283 | Do. |
| 284 | Blue-violet. |
| 285 | Do. |
| 286 | Do. |
| 287 | Do. |
| 288 | Orange-yellow. |
| 289 | Do. |
| 290 | Orange-yellow. |
| 291 | Scarlet. |
| 292 | Orange-yellow. |
| 293 | Orange. |
| 294 | Blue-red. |
| 295 | Red. |
| 296 | Red. |
| 297 | Blue-red. |
| 298 | Do. |
| 299 | Violet. |
| 300 | Blue-red. |
| 301 | Do. |
| 302 | Do. |
| 303 | Do. |
| 304 | Do. |
| 305 | Do. |
| 306 | Blue-gray. |
| 307 | Greenish black. |
| 308 | Blue-red. |
| 309 | Red-violet. |
| 310 | Greenish black. |
| 311 | Navy blue. |
| 312 | Do. |
| 313 | Do. |
| 314 | Do. |
| 315 | Greenish black. |
| 316 | Navy blue. |
| 317 | Do. |
| 318 | Do. |
| 319 | Navy blue. |
| 320 | Bluish black. |
| 321 | Navy blue. |
| 322 | Do. |
| 323 | Do. |
| 324 | Do. |
| 325 | Do. |
| 326 | Do. |
| 327 | Do. |
| 328 | Do. |
| 329 | Do. |
| 330 | Do. |
| 331 | Brown. |
| 332 | Do. |
| 333 | Do. |
| 334 | Do. |
| 335 | Red-brown. |

| Dyestuff No.: | Shade |
|---|---|
| 336 | Brown. |
| 337 | Do. |
| 338 | Do. |
| 339 | Do. |
| 340 | Violettish brown. |
| 341 | Do. |
| 342 | Do. |
| 343 | Violet. |
| 344 | Olive brown. |
| 345 | Brown. |
| 346 | Violettish brown. |
| 347 | Red-brown. |
| 348 | Violettish brown. |
| 349 | Brown. |
| 350 | Do. |
| 351 | Blue. |
| 352 | Greenish blue. |
| 353 | Reddish blue. |
| 354 | Do. |
| 355 | Do. |
| 356 | Blue. |
| 357 | Do. |
| 358 | Do. |
| 359 | Reddish blue. |
| 360 | Yellowish brown. |
| 361 | Do. |
| 362 | Do. |
| 363 | Do. |
| 364 | Do. |
| 365 | Do. |
| 366 | Do. |
| 367 | Reddish brown. |
| 368 | Yellowish brown. |
| 369 | Reddish brown. |
| 370 | Brown. |
| 371 | Yellowish brown. |
| 372 | Orange-red. |
| 373 | Orange. |
| 374 | Do. |
| 375 | Do. |
| 376 | Do. |
| 377 | Do. |
| 378 | Red. |
| 379 | Orange. |
| 380 | Red. |
| 381 | Brown. |
| 382 | Red. |
| 383 | Scarlet. |
| 384 | Greenish blue. |
| 385 | Do. |
| 386 | Blue. |
| 387 | Blue-green. |
| 388 | Blue. |
| 389 | Do. |
| 390 | Do. |
| 391 | Do. |
| 392 | Blue-violet. |
| 393 | Do. |
| 394 | Do. |
| 395 | Do. |
| 396 | Do. |
| 397 | Do. |
| 398 | Do. |
| 399 | Do. |
| 400 | Do. |
| 401 | Do. |
| 402 | Do. |
| 403 | Reddish yellow. |
| 404 | Orange. |
| 405 | Reddish yellow. |
| 406 | Brown-orange. |
| 407 | Orange-brown. |
| 408 | Do. |
| 409 | Do. |
| 410 | Do. |
| 411 | Do. |
| 412 | Blue-red. |
| 413 | Orange-brown. |
| 414 | Do. |
| 415 | Do. |
| 416 | Do. |
| 417 | Blue-red. |
| 418 | Blue-violet. |
| 419 | Red-brown. |
| 420 | Red. |
| 421 | Red. |
| 422 | Red. |
| 423 | Red. |
| 424 | Red. |
| 425 | Red. |
| 426 | Red-violet. |
| 427 | Red. |
| 428 | Turquoise-blue. |
| 429 | Do. |
| 430 | Do. |

Formulae of representative dyestuffs of the foregoing examples are as follows:

*Example 1*

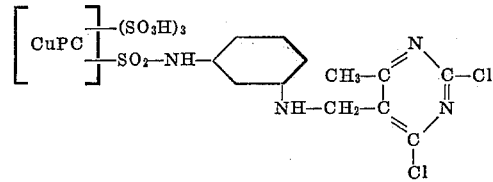

The three —SO$_3$H groups stand in the positions 3,3′,3″ and the group —SO$_2$—NH— in the position 3‴ of the copper phthalocyanine molecule.

*Example 2*

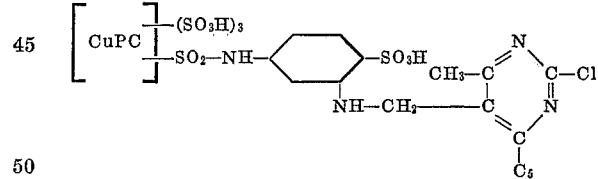

The three —SO$_3$H groups stand in the positions 4,4′4″ and the group —SO$_2$—NH— in the position 4‴ of the copper phthalocyanine molecule.

*Example 3*

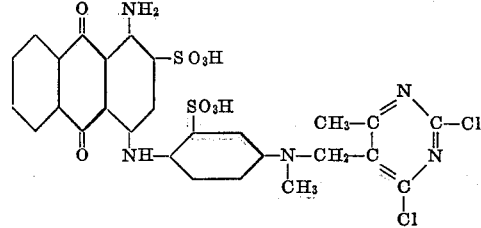

*Example 4*

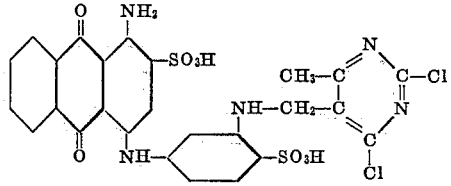

Example 5

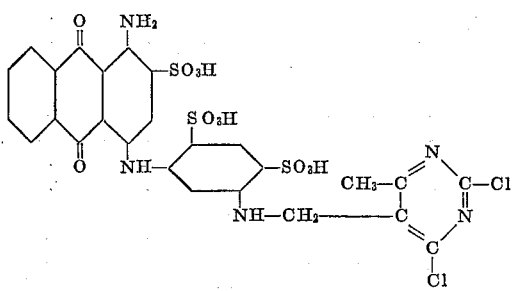

Examples 6 and 8

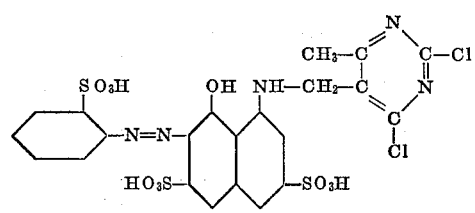

Example 7

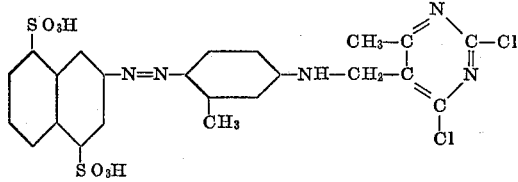

Example 9

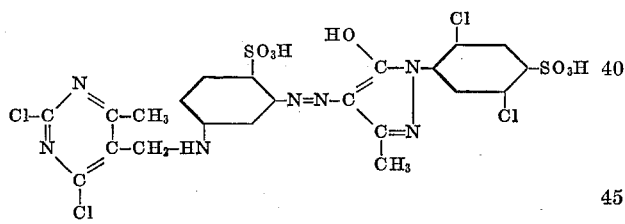

Example 10

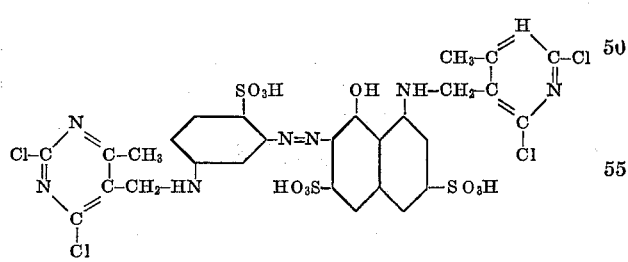

Example 11

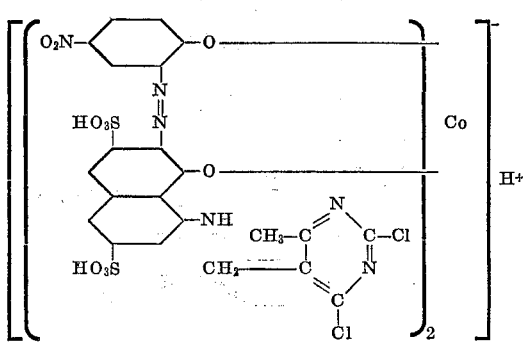

Example 1 (last paragraph)

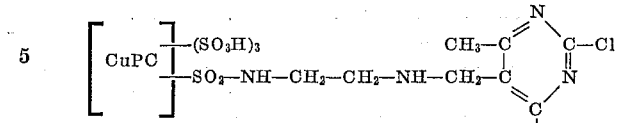

The three —SO$_3$H groups stand in the position 3,3′,3″ and the group —SO$_2$—NH— stands in the position 3‴ of the copper phthalocyanine molecule.

Example 95

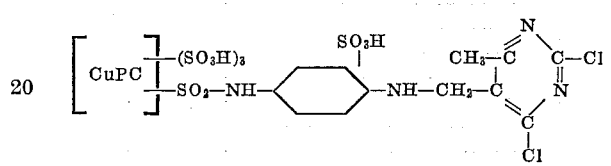

The three —SO$_3$H groups stand in the positions 3,3′,3″ and the group —SO$_2$—NH— stands in the position 3‴ of the copper phthalocyanine molecule.

Example 119

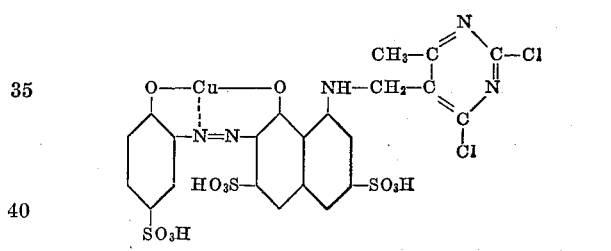

Example 310

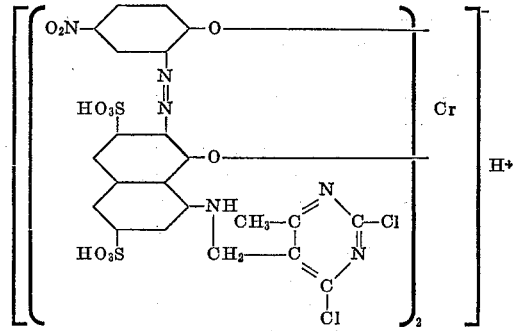

Example 311

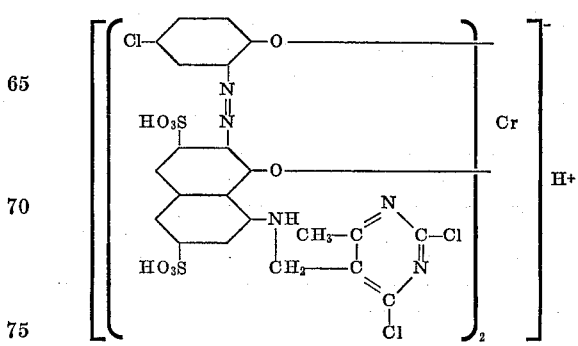

Example 316

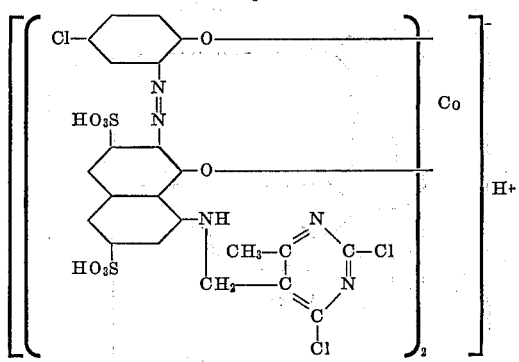

Example 351

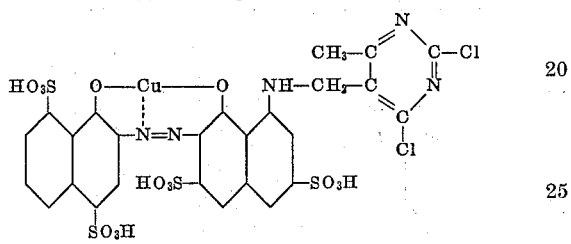

Example 428

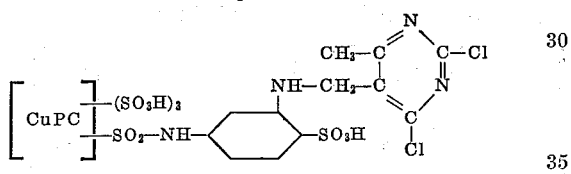

The three —SO₃H groups stand in the positions 3,3′,3″ and the group —SO₂—NH— stands in the position 3‴ of the copper phthalocyanine molecule.

Example 429

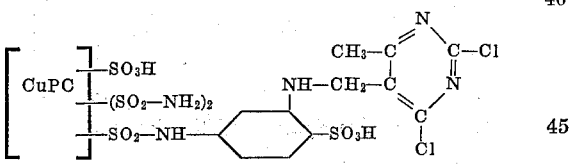

The —SO₃H group stands in the position 4; the

—SO₂—NH₂ groups stand in two of the positions 4′,4″ and 4‴ and the group —SO₂—NH stand in one of the positions 4′,4″ and 4‴.

Having thus disclosed the invention what we claim is:
1. Water-soluble organic dyestuff of the formula

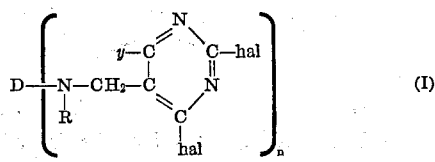

wherein

D is a dyestuff grouping selected from the group consisting of
(I) an unmetallized monoazo dyestuff grouping bearing from 2 to 4 HO₃S-groups and selected from the group consisting of
 (1) benzene-azo-benzene groupings,
 (2) benzene-azo-naphthalene groupings,
 (3) diphenyl-azo-naphthalene groupings,
 (4) benzene-azo-5-pyrazolone groupings,
 (5) diphenyl-azo-5-pyrazolone groupings,
 (6) naphthalene-azo-5-pyrazolone groupings and (7) naphthalene-azo-naphthalene groupings;
(II) chromium, cobalt, nickel and copper complexes of the unmetallized monoazo dyestuff grouping;
(III) a disazo dyestuff grouping bearing from 2 to 4 HO₃S-groups and selected from the group consisting of
 (1) benzene-azo-benzene-azo-benzene groupings,
 (2) benzene-azo-benzene-azo-naphthalene groupings,
 (3) benzene-azo-naphthalene-azo-benzene groupings,
 (4) benzene-azo-benzene-azo-5-pyrazolone groupings,
 (5) naphthalene-azo-diphenyl-azo-benzene groupings,
 (6) naphthalene-azo-naphthalene-azo-naphthalene groupings,
 (7) benzene-azo-naphthalene-azo-naphthalene groupings and
 (8) naphthalene-azo-benzene-azo-naphtha-groupings;
(IV) 1 - amino-2-sulfo-4-arylaminoanthraquinone dyestuff groupings having a total of from two to three sulfonic acid groups and wherein the aryl is hydrocarbon and is from mononuclear to binuclear; and
(V) 1-amino-2-phenoxy - 4 - arylaminoanthraquinone dyestuff groupings having a total of from two to three sulfonic acid groups and wherein the aryl is hydrocarbon and is from mononuclear to binuclear and phenoxy encompasses phenoxy itself and its alkyl derivatives with 1 to 8 carbon atoms in the alkyl group; and
(VI) phthalocyaninesulfonic acid dyestuff groupings containing from 2 to 4 water-solubilizing substituents selected from the group consisting of —SO₃H and —SO₂—NH₂,
R is a member selected from the group consisting of hydrogen and lower alkyl,
y is a member selected from the group consisting of hydrogen and lower alkyl,
hal is a halogen atom with an atomic number from 17 to 35, inclusive,
and n is one of the integers 1 and 2,
and the group

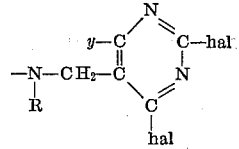

is bound to an aromatic nucleus of the dyestuff radical.
2. The reactive dyestuff of the formula

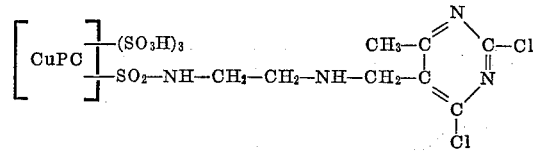

wherein the three —SO₃H groups stand in the position 3,3′,3″ and the group —SO₂—NH— stands in the posistion 3‴ of the copper phthalocyanine molecule.
3. The reactive dyestuff of the formula

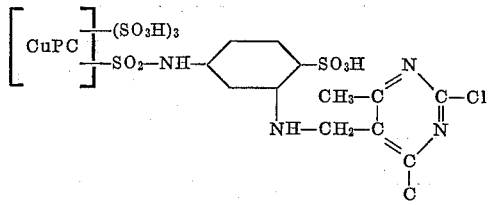

wherein the three —SO₃H groups stand in the positions 4,4′,4″ and the group —SO₂—NH— in the position 4‴ of the copper phthalocyanine molecule.

4. The reactive dyestuff of the formula

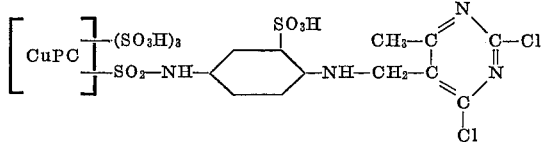

wherein the three —SO₃H groups stand in the position 3,3′,3″ and the group —SO₂—NH— stands in the position 3‴ of the copper phthalocyanine molecule.

5. The reactive dyestuff of the formula

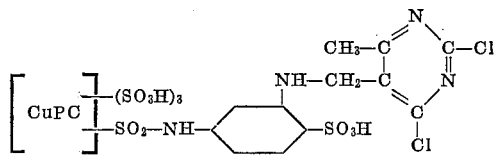

wherein the three —SO₃H groups stand in the position 3,3′,3″ and the group —SO₂—NH— stands in the position 3‴ of the copper phthalocyanine molecule.

6. The reactive dyestuff of the formula

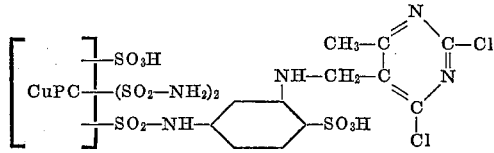

wherein the —SO₃H group stands in the position 4; the —SO₂—NH₂ groups stand in two of the positions 4′, 4″ and 4‴ and the group —SO₂—NH— stands in the one of the positions 4′, 4″ and 4‴.

7. The reactive dyestuff of the formula

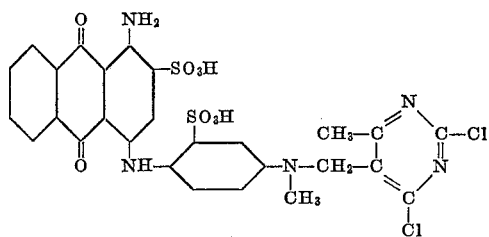

8. The reactive dyestuff of the formula

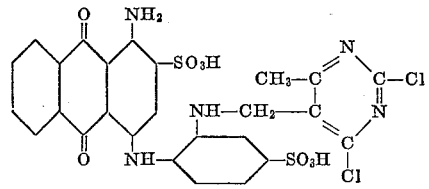

9. The reactive dyestuff of the formula

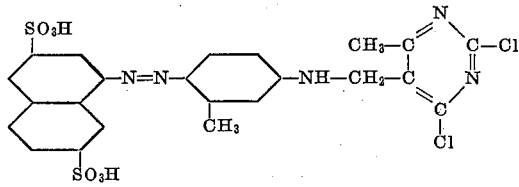

10. The reactive dyestuff of the formula

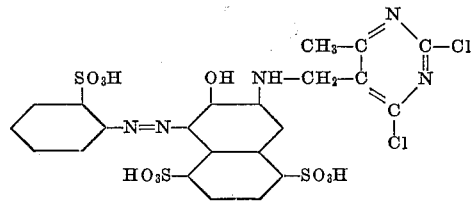

11. The reactive dyestuff of the formula

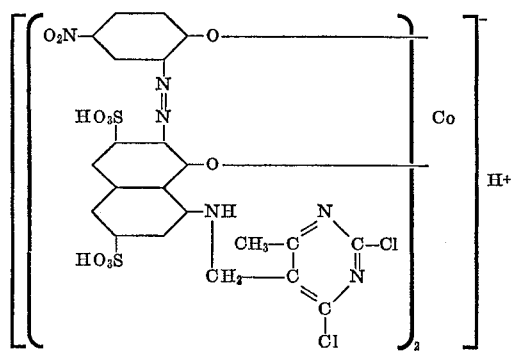

12. The reactive dyestuff of the formula

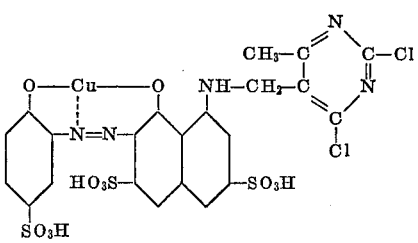

13. The reactive dyestuff of the formula

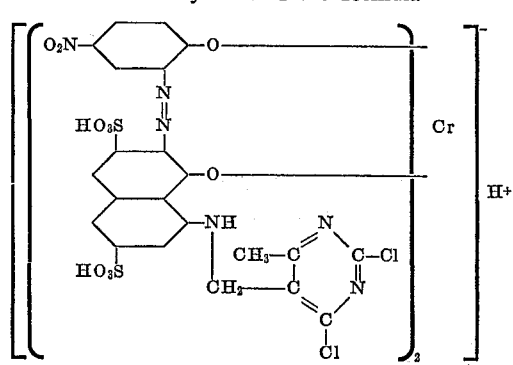

14. The reactive dyestuff of the formula

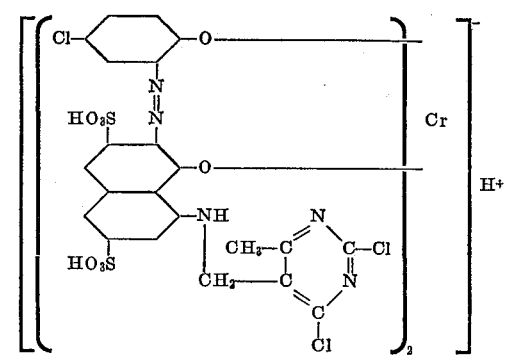

15. The reactive dyestuff of the formula

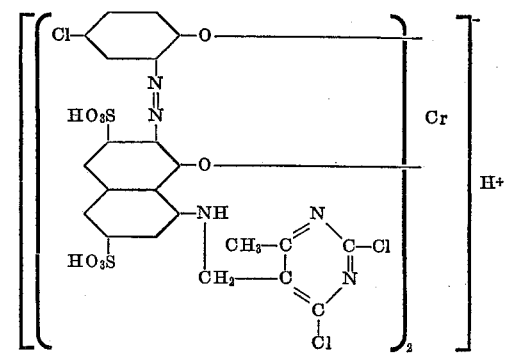

16. The reactive dyestuff of the formula
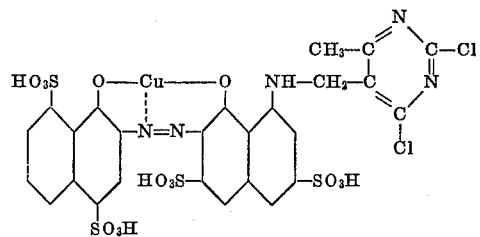
References Cited by the Examiner
UNITED STATES PATENTS
| | | | |
|---|---|---|---|
| 2,820,785 | 1/58 | Zollinger et al. | 260—154 |
| 2,935,506 | 5/60 | Heslop et al. | 260—154 |
| 3,042,475 | 7/62 | Heslop et al. | 260—154 |
FOREIGN PATENTS
| | | |
|---|---|---|
| 1,225,282 | 2/60 | France. |
| 583,223 | 10/58 | Italy. |
CHARLES B. PARKER, *Primary Examiner.*